(12) United States Patent
Morimoto

(10) Patent No.: US 12,307,081 B2
(45) Date of Patent: May 20, 2025

(54) IMAGE DISPLAY METHOD, IMAGE DISPLAY SYSTEM, AND IMAGE DISPLAY APPARATUS

(71) Applicant: SEIKO EPSON CORPORATION, Tokyo (JP)

(72) Inventor: Takumi Morimoto, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 88 days.

(21) Appl. No.: 18/128,354

(22) Filed: Mar. 30, 2023

(65) Prior Publication Data

US 2023/0315275 A1 Oct. 5, 2023

(30) Foreign Application Priority Data

Mar. 31, 2022 (JP) ................. 2022-058553

(51) Int. Cl.
 *G06F 3/04842* (2022.01)
 *G06F 3/04847* (2022.01)
 *G06F 3/14* (2006.01)
 *H04N 9/31* (2006.01)

(52) U.S. Cl.
 CPC ........ *G06F 3/04847* (2013.01); *G06F 3/1423* (2013.01); *G06F 3/04842* (2013.01); *H04N 9/3179* (2013.01)

(58) Field of Classification Search
 CPC ............... G06F 3/04847; G06F 3/1423; G06F 3/04842; H04N 9/3179
 See application file for complete search history.

(56) References Cited

U.S. PATENT DOCUMENTS

| 2007/0052733 | A1* | 3/2007 | Hirabayashi ............. G09G 5/02 345/661 |
| 2009/0002577 | A1 | 1/2009 | Watanabe et al. |
| 2009/0268960 | A1 | 10/2009 | Imai et al. |
| 2011/0242124 | A1 | 10/2011 | Tsukagoshi |

(Continued)

FOREIGN PATENT DOCUMENTS

| JP | 2009-267929 A | 11/2009 |
| JP | 2011-217310 A | 10/2011 |

(Continued)

OTHER PUBLICATIONS

Li Lin et al., The impact of Exposure Setting In Digital Image Forensics, Aug. 29, 2018, IEEE International Conference on Image Processing (ICIP), pp. 540-544 (Year: 2018).*

(Continued)

*Primary Examiner* — Tam T Tran
(74) *Attorney, Agent, or Firm* — Oliff PLC

(57) ABSTRACT

An image display method includes: displaying a first setting image including a first image that indicates a first setting value and a second image that indicates a second setting value; receiving a first operation for selecting one of the first image and the second image; displaying, when the first operation is received, a second setting image including a third image that indicates a third setting value and a fourth image that indicates a fourth setting value; receiving a second operation for selecting one of the third image and the fourth image; and displaying an input image adjusted based on the first operation and the second operation.

9 Claims, 14 Drawing Sheets

(56) References Cited

U.S. PATENT DOCUMENTS

| | | | |
|---|---|---|---|
| 2013/0202209 A1* | 8/2013 | Ariyama | G06V 10/993 |
| | | | 382/190 |
| 2014/0189590 A1* | 7/2014 | Um | G06F 3/04845 |
| | | | 715/825 |
| 2016/0350050 A1 | 12/2016 | Kanamori et al. | |
| 2016/0353096 A1* | 12/2016 | Tomono | H04N 9/3179 |
| 2020/0287229 A1 | 9/2020 | Pintauro | |
| 2021/0021722 A1* | 1/2021 | Takahama | H04N 1/00411 |

FOREIGN PATENT DOCUMENTS

| | | |
|---|---|---|
| JP | 2016-224225 A | 12/2016 |
| JP | 2016-224661 A | 12/2016 |
| JP | 2021-019249 A | 2/2021 |
| JP | 2021-022239 A | 2/2021 |
| WO | 2006/027866 A1 | 3/2006 |

OTHER PUBLICATIONS

David Choi et al., Improved Image Selection For Focus Stacking In Digital Photography, Sep. 1, 2017, IEEE International Conference on Image Processing (ICIP), pp. 2761-2765 (Year: 2017).*
Panasonic Corporation, Geometry Manager Pro-Manual, 2021.
Panasonic Connect Co., Ltd., "Software Applications".

* cited by examiner

FIG. 7
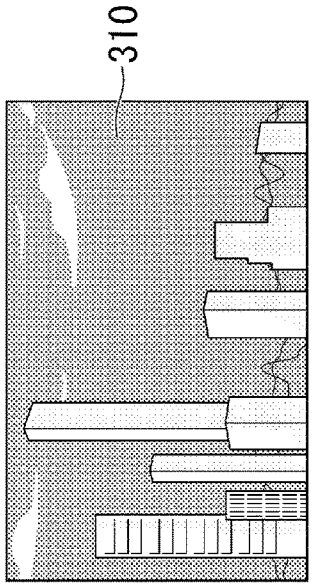
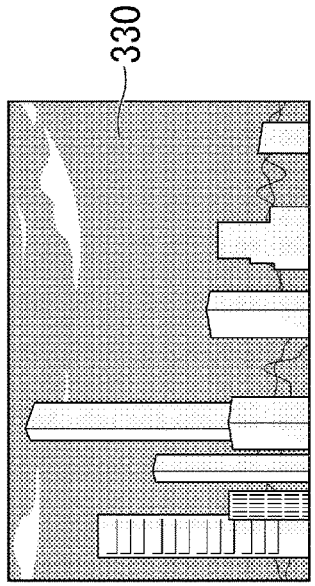
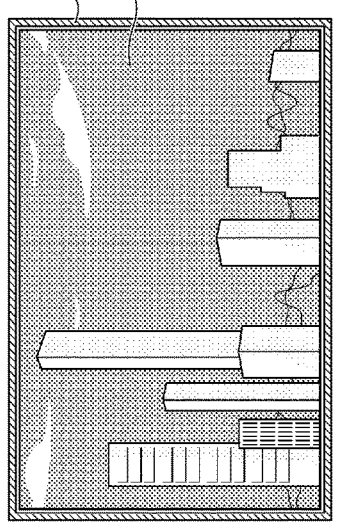
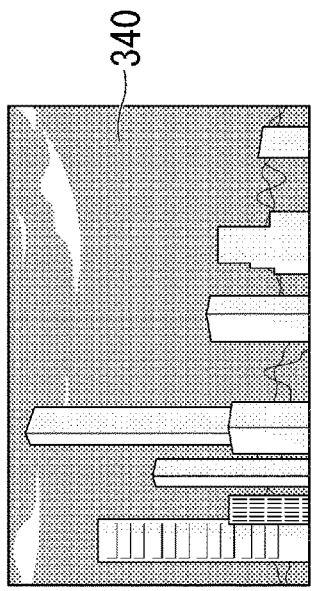
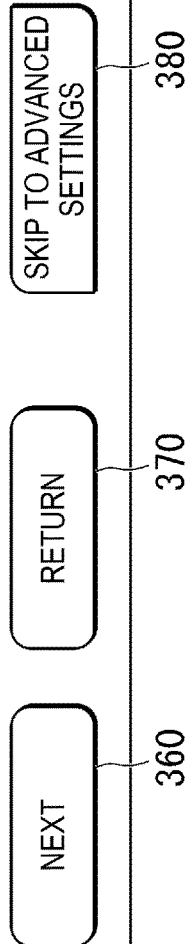

FIG. 14
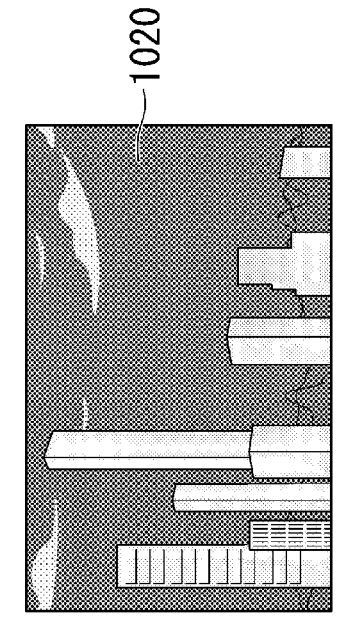
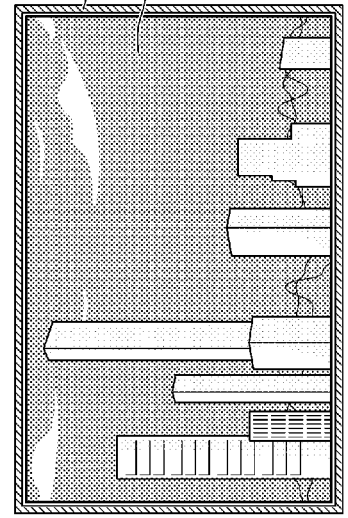
PLEASE SELECT USER
DISPLAY IN DESCENDING ORDER OF THE NUMBER OF SETTINGS
FIRST — USER NAME: AAAA
SECOND — USER NAME: BBBB
1000, 1010, 1020, 1030, 1040
DECISION

IMAGE DISPLAY METHOD, IMAGE DISPLAY SYSTEM, AND IMAGE DISPLAY APPARATUS

The present application is based on, and claims priority from JP Application Serial Number 2022-058553, filed Mar. 31, 2022, the disclosure of which is hereby incorporated by reference herein in its entirety.

BACKGROUND

1. Technical Field

The present disclosure relates to an image display method, an image display system, and an image display apparatus.

2. Related Art

JP-A-2021-22239 discloses a method of changing at least two of brightness, contrast ratio, focus, aspect ratio, playback speed, chromaticity, projection angle, and projection magnification of a video according to words representing an impression on a space in which the video is projected by a projector.

In the method disclosed in JP-A-2021-22239, setting values for the parameters described above are stored in advance in a storage device of the projector in association with a plurality of words such as "refreshing" and "relaxing". Therefore, it is not possible to respond to a user request to adjust the video in more detail in an intuitive manner.

SUMMARY

An image display method according to one aspect of the present disclosure includes: displaying a first setting image including a first image that indicates a first setting value and a second image that indicates a second setting value; receiving a first operation for selecting one of the first image and the second image; displaying, when the first operation is received, a second setting image including a third image that indicates a third setting value and a fourth image that indicates a fourth setting value; receiving a second operation for selecting one of the third image and the fourth image; and displaying an input image adjusted based on the first operation and the second operation.

An image display system according to one aspect of the present disclosure includes: a first image display device; and a second image display device different from the first image display device. The first image display device includes a first display device configured to display an image, and a first processor configured to control the first display device. The second image display device includes a second display device configured to display an image, and a second processor configured to control the second display device. The first processor is configured to display a first setting image including a first image that indicates a first setting value and a second image that indicates a second setting value on the first display device, receive a first operation for selecting one of the first image and the second image, display, when the first operation is received, a second setting image including a third image that indicates a third setting value and a fourth image that indicates a fourth setting value on the first display device, and receive a second operation for selecting one of the third image and the fourth image. The second processor is configured to display an input image adjusted based on the first operation and the second operation on the second display device.

An image display apparatus according to one aspect of the present disclosure includes: a display device configured to display an image; and a processor configured to control the display device. The processor is configured to display a first setting image including a first image that indicates a first setting value and a second image that indicates a second setting value on the display device, receive a first operation for selecting one of the first image and the second image, display, when the first operation is received, a second setting image including a third image that indicates a third setting value and a fourth image that indicates a fourth setting value on the display device, receive a second operation for selecting one of the third image and the fourth image, and display an input image adjusted based on the first operation and the second operation on the display device.

BRIEF DESCRIPTION OF THE DRAWINGS

FIG. 7 is a diagram showing an example of a first video genre selection image.

FIG. 14 is a diagram showing an example of a user selection image.

DESCRIPTION OF EXEMPLARY EMBODIMENTS

Hereinafter, embodiments of the present disclosure will be described with reference to the drawings.

In the following drawings, the scale of dimensions may be different depending on components to make each component easier to see.

First Embodiment

First, a first embodiment according to the present disclosure will be described.

Figure 1:
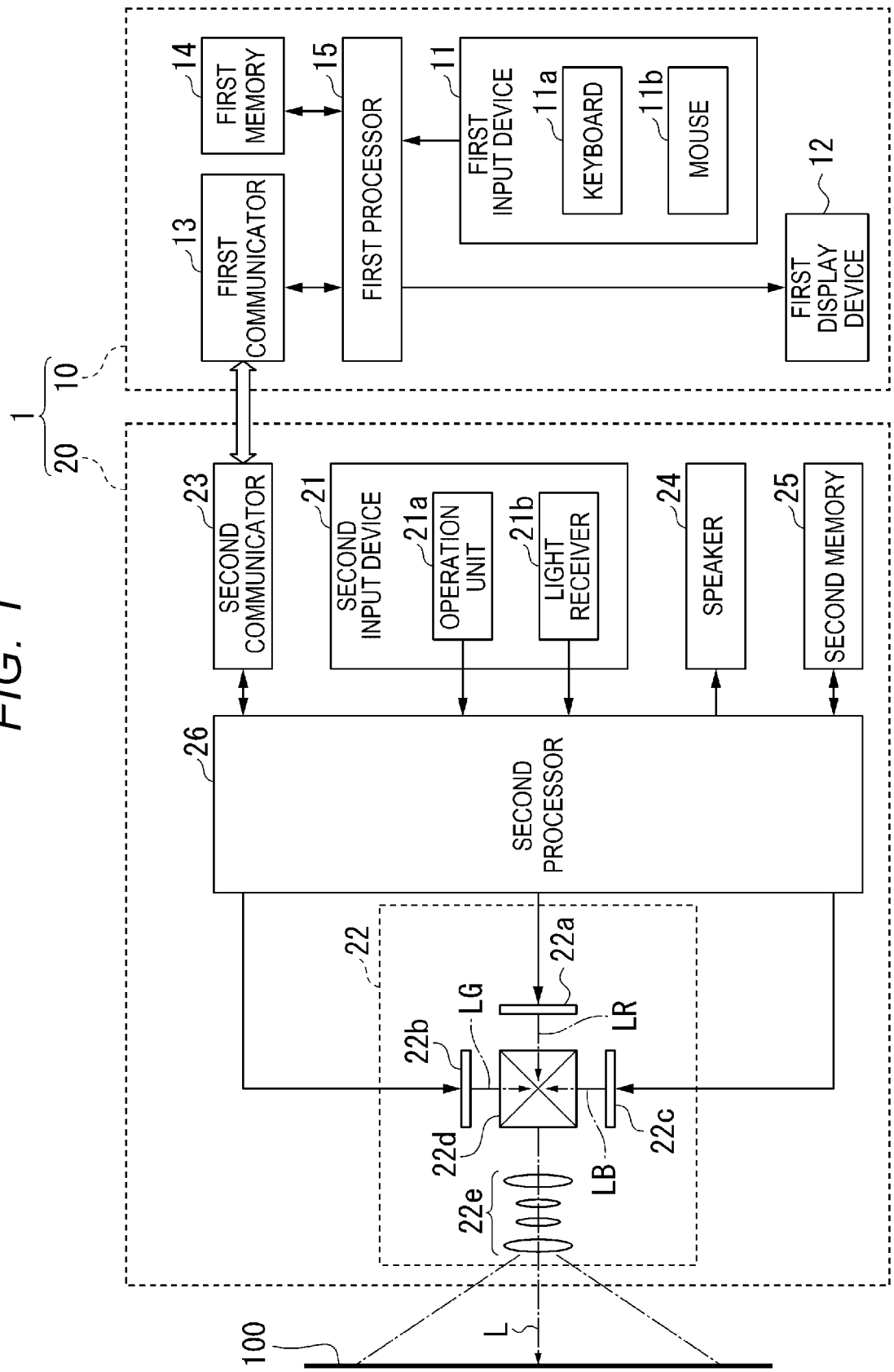
FIG. 1 is a block diagram schematically showing a configuration of an image display system according to an embodiment.

FIG. 1 is a block diagram schematically showing a configuration of an image display system 1 according to the embodiment. As shown in FIG. 1, the image display system 1 according to the embodiment includes a first image display device 10 and a second image display device 20. The first image display device 10 is an information processing device having an image display function, such as a desktop personal computer (PC), a notebook PC, a tablet terminal, or a smartphone. More specifically, the first image display device 10 is a device capable of activating a predetermined application and displaying a graphical user interface (GUI) provided by the application. As an example, the first image display device 10 according to the embodiment is a notebook PC.

The second image display device 20 is an image display device different from the first image display device 10. As an example, the second image display device 20 according to the embodiment is a projector that displays an image on a projection surface 100 by projecting image light L onto the projection surface 100. The projection surface 100 may be a dedicated projector screen, a wall surface, or the like. In the following description, projection of the image light L by the second image display device 20 may be rephrased as "the second image display device 20 displays an image".

The first image display device 10 and the second image display device 20 are coupled to each other via a communication cable (not shown). The first image display device 10 supplies a video signal to the second image display device 20 via the communication cable. The second image display device 20 generates the image light L based on the video signal supplied from the first image display device 10, and projects the generated image light L onto the projection surface 100.

The first image display device 10 includes a first input device 11, a first display device 12, a first communicator 13, a first memory 14, and a first processor 15. The second image display device 20 includes a second input device 21, a second display device 22, a second communicator 23, a speaker 24, a second memory 25, and a second processor 26.

The first input device 11 is a device that receives a user input operation to the first image display device 10. As an example, the first input device 11 includes a keyboard 11a and a mouse 11b. The first input device 11 outputs, to the first processor 15, an electrical signal generated by the user operating the keyboard 11a and the mouse 11b as a first operation signal.

The first display device 12 is a display panel that displays a predetermined image under control of the first processor 15. For example, the first display device 12 is a thin display such as a liquid crystal display or an organic electro-luminescence (EL) display mounted on the first image display device 10, which is a notebook PC.

The first communicator 13 is a communication interface coupled to the second communicator 23 of the second image display device 20 via the communication cable. The first communicator 13 includes, for example, an interface circuit. The first communicator 13 outputs, to the first processor 15, a signal received from the second communicator 23. The first communicator 13 also transmits, to the second communicator 23, various signals such as a video signal received from the first processor 15. The first communicator 13 also has a function of accessing the Internet via a wireless local area network (LAN) that supports a wireless communication standard such as Wi-Fi (registered trademark) and communicating with an Internet server (not shown) that provides various services such as a video distribution service.

The first memory 14 includes a nonvolatile memory that stores a program necessary for causing the first processor 15 to execute various types of processing, various types of setting data, and the like, and a volatile memory used as a temporary storage of data when the first processor 15 executes various types of processing. For example, the nonvolatile memory is an electrically erasable programmable read-only memory (EEPROM), a flash memory, or the like. The volatile memory is, for example, a random access memory (RAM). The program stored in the first memory 14 also includes an image adjustment application software to be described later.

The first processor 15 is an arithmetic processing device that controls an overall operation of the first image display device 10 according to the program stored in advance in the first memory 14. As an example, the first processor 15 includes one or more central processing units (CPU). Some or all of the functions of the first processor 15 may be implemented by a circuit such as a digital signal processor (DSP), an application specific integrated circuit (ASIC), a programmable logic device (PLD), and a field programmable gate array (FPGA). The first processor 15 executes various types of processing in parallel or sequentially.

For example, the first processor 15 executes predetermined processing based on the first operation signal input from the first input device 11 and a signal received from the second image display device 20 via the first communicator 13, and displays an image indicating a processing result thereof on the first display device 12. In addition, the first processor 15 transmits various signals such as a signal indicating a processing result and a video signal to the second image display device 20 via the first communicator 13.

The second input device 21 is a device that receives a user input operation for the second image display device 20. As an example, the second input device 21 includes an operation unit 21a and a light receiver 21b. The operation unit 21a includes a plurality of operation keys provided in the second image display device 20. For example, the operation keys include a power key, a menu call key, a direction key, an enter key, and a volume control key. The operation keys may be hardware keys or software keys displayed on a touch panel that is provided in the second image display device 20. The operation unit 21a outputs, to the second processor 26, an electrical signal generated by the user operating each operation key as a second operation signal.

The light receiver 21b includes a photoelectric conversion circuit that receives infrared light transmitted from a remote controller (not shown) of the second image display device 20 and converts the infrared light into an electrical signal. The light receiver 21b outputs, to the second processor 26, the electrical signal obtained by photoelectric conversion of the infrared light as a remote operation signal. The remote controller is provided with a plurality of operation keys in the same manner as the operation unit 21a. The remote controller converts an electrical signal generated by the user operating each operation key provided on the remote controller into infrared light and transmits the infrared light to the second image display device 20. That is, the remote operation signal output from the light receiver 21b is substantially the same as the electrical signal generated by the user operating each operation key of the remote controller. When the remote controller transmits a radio wave signal according to a short-range wireless communication standard such as Bluetooth (registered trademark), a receiving device that receives the radio wave signal may be provided instead of the light receiver 21b.

The second display device 22 is controlled by the second processor 26 to generate the image light L representing a color image and project the generated image light L toward the projection surface 100. The second display device 22 can be rephrased as a projection device. The second display device 22 includes a first image generation panel 22a, a second image generation panel 22b, a third image generation panel 22c, a dichroic prism 22d, and a projection optical system 22e.

The first image generation panel 22a generates red image light LR representing a red image and emits the red image light LR to the dichroic prism 22d. The first image generation panel 22a includes a plurality of pixels arranged in a matrix, and each of the plurality of pixels emits red light. The red image light LR is emitted from the first image generation panel 22a by controlling an emission amount of the red light for each pixel by the second processor 26.

The second image generation panel 22b generates green image light LG representing a green image and emits the green image light LG to the dichroic prism 22d. The second image generation panel 22b includes a plurality of pixels arranged in a matrix, and each of the plurality of pixels emits green light. The green image light LG is emitted from the second image generation panel 22b by controlling an emission amount of the green light for each pixel by the second processor 26.

The third image generation panel 22c generates blue image light LB representing a blue image and emits the blue image light LB to the dichroic prism 22d. The third image generation panel 22c includes a plurality of pixels arranged in a matrix, and each of the plurality of pixels emits blue light. The blue image light LB is emitted from the third image generation panel 22c by controlling an emission amount of the blue light for each pixel by the second processor 26.

For example, each of the image generation panels 22a, 22b, and 22c is a self-luminous electro-optical device such as an organic light emitting diode (OLED) panel or a micro light emitting diode (μLED) panel. The image generation panels 22a, 22b, and 22c may be a liquid crystal panel or a non-self-luminous electro-optical device such as a digital micromirror device (DMD). When each of the image generation panels 22a, 22b, and 22c is a non-self-luminous electro-optical device, light from a light source (not shown) such as an LED is separated into red light, green light, and blue light. The red light enters the first image generation panel 22a. The green light enters the second image generation panel 22b. The blue light enters the third image generation panel 22c. Alternatively, a single image generation panel may be used to emit light of a corresponding color in a time division manner.

The dichroic prism 22d combines the red image light LR, the green image light LG, and the blue image light LB to generate the image light L representing a color image, and emits the image light L to the projection optical system 22e. The projection optical system 22e includes a plurality of optical elements such as lenses, and enlarges and projects the image light L emitted from the dichroic prism 22d toward the projection surface 100. Although not shown, the projection optical system 22e is provided with a mechanism capable of adjusting optical parameters such as a lens shift amount, a lens focus amount, and a lens zoom amount. The optical parameters of the projection optical system 22e are adjusted by controlling the mechanism by the second processor 26.

The second communicator 23 is a communication interface coupled to the first communicator 13 of the first image display device 10 via the communication cable. The second communicator 23 includes, for example, an interface circuit. The second communicator 23 outputs, to the second processor 26, various signals such as a video signal received from the first communicator 13. The second communicator 23 also transmits, to the first communicator 13, a signal input from the second processor 26.

The speaker 24 is controlled by the second processor 26 to output a sound having a predetermined volume. The second memory 25 includes a nonvolatile memory that stores a program necessary for causing the second processor 26 to execute various types of processing, various types of setting data, and the like, and a volatile memory used as a temporary storage of data when the second processor 26 executes various types of processing.

The second processor 26 is an arithmetic processing device that controls all overall operation of the second image display device 20 according to the program stored in advance in the second memory 25. As an example, the second processor 26 includes a single or a plurality of CPUs. Some or all of the functions of the second processor 26 may be implemented by a circuit such as a DSP, an ASIC, a PLD, and an FPGA. The second processor 26 executes various types of processing in parallel or sequentially.

For example, the second processor 26 controls the second display device 22 and the speaker 24 based on a second operation signal input from the operation unit 21a, a remote operation signal input from the light receiver 21b, and a signal received from the first image display device 10 via the second communicator 23. Specifically, the second processor 26 controls the second display device 22 such that an image based on image data that is included in the video signal supplied from the first image display device 10 is displayed (projected) on the projection surface 100, and controls the speaker 24 such that a sound based on sound data that is included in the video signal is output.

Next, an operation of the image display system 1 configured as described above will be described.

FIGS. 2 to 5 are flowcharts showing image adjustment processing executed by the first processor 15 of the first image display device 10. When receiving an operation for activating the image adjustment application, the first processor 15 reads out the image adjustment application software from the first memory 14 and executes the software to execute the image adjustment processing shown in FIGS. 2 to 5.

The operation for activating the image adjustment application is, for example, the user double-clicking, by using the mouse 11b, an icon for activating the image adjustment application displayed on a screen of the first display device 12.

Figure 2:
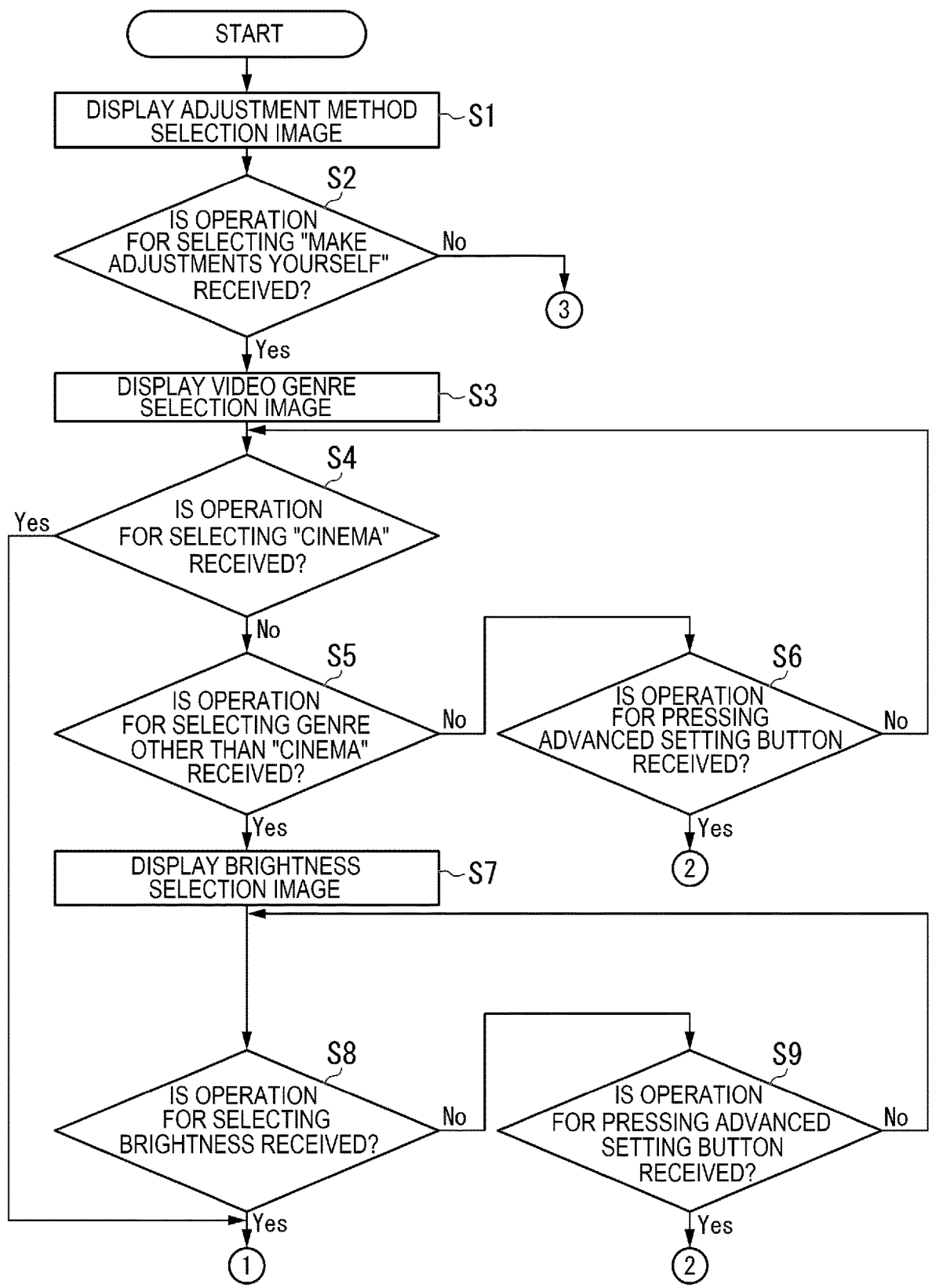
FIG. 2 is a flowchart showing image adjustment processing executed by a first processor.

As shown in FIG. 2, when starting the image adjustment processing, the first processor 15 first displays an application window including an adjustment method selection image 200 on the first display device 12 as a GUI (step S1).

Figure 6:
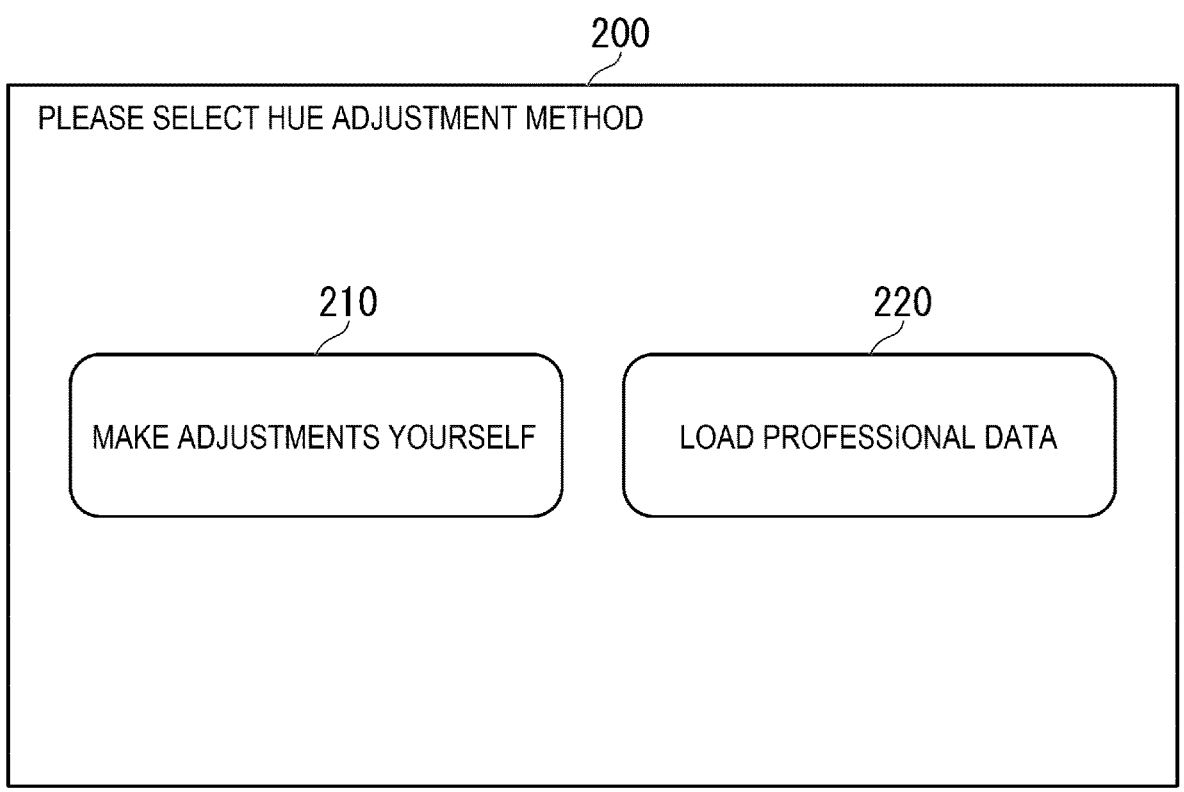
FIG. 6 is a diagram showing an example of an adjustment method selection image.

FIG. 6 is a diagram showing an example of the adjustment method selection image 200. The adjustment method selection image 200 is an image for requesting the user to select a hue adjustment method for an input image. The adjustment method selection image 200 includes a first option image 210 indicating a first option and a second option image 220 indicating a second option. The adjustment method selection image 200 corresponds to a "selection image".

The first option image 210 includes a character string corresponding to the first option. As an example, the character string corresponding to the first option is "make adjustments yourself". As to be described below, when receiving an operation for selecting the first option image 210, the first processor 15 executes processing to adjust a hue of the input image according to the operation received from the user. The first option image 210 corresponds to a "sixth image".

The second option image 220 includes a character string corresponding to the second option. As an example, the character string corresponding to the second option is "load professional data". As to be described below, when receiving an operation for selecting the second selection option image 220, the first processor 15 accesses the Internet via the first communicator 13, and executes processing to receive a hue setting value for adjusting the hue of the input image from the Internet server. The second option image 220 corresponds to a "seventh image".

The application window displayed on the screen of the first display device 12 includes not only the adjustment method selection image 200 as described above but also a plurality of images such as various operation icons for image adjustment, an icon for changing a size of the application window, and an icon for closing the application window. The various icons included in the application window correspond to an "eighth image". The application window corresponds to a "fifth setting image".

The input image is an image indicated by image data included in the video signal. The video signal may be a video signal received from the Internet server that provides the video distribution service, or may be a digital versatile disc (DVD) video signal read by a DVD drive (not shown) mounted on the first image display device 10. The input image is an image input to the first image display device 10 via the Internet, the DVD drive, or the like as described above, and is an original image that has not been subjected to image processing such as hue adjustment and shape correction after being input to the first image display device 10.

As shown in FIG. 2, the first processor 15 determines, based on the first operation signal input from the first input device 11, whether the operation for selecting the first option image 210 is received in a period during which the adjustment method selection image 200 is displayed (step S2). In other words, the first processor 15 determines whether the operation for selecting the first option "make adjustments yourself" as the hue adjustment method is received.

When determining that the operation for selecting the first option image 210 is received (step S2: Yes), the first processor 15 displays an application window including a first video genre selection image 300 on the first display device 12 (step S3). The operation for selecting the first option image 210 is, for example, the user clicking the first option image 210 by using the mouse 11b.

On the other hand, when determining that the operation for selecting the first option image 210 is not received in the period during which the adjustment method selection image 200 is displayed (step S2: No), the first processor 15 proceeds to step S25 in a flowchart in FIG. 5. That is, when determining that the operation for selecting the second selection option image 220 is received, the first processor 15 proceeds to step S25.

In other words, when determining that the operation for selecting the second option "load professional data" as the hue adjustment method is received, the first processor 15 proceeds to step S25. The operation for selecting the second option image 220 is, for example, the user clicking the second option image 220 by using the mouse 11b. First, processing executed by the first processor 15 when the operation for selecting the first option image 210 is received will be described below.

FIG. 7 is a diagram showing an example of the first video genre selection image 300. The first video genre selection image 300 is an image for requesting the user to select a video genre for the input image. The first video genre selection image 300 includes a first candidate image 310, a second candidate image 320, a third candidate image 330, a fourth candidate image 340, a selection frame 350, a forward operation button 360, a return operation button 370, and an advanced setting button 380. The first video genre selection image 300 corresponds to a "first setting image".

The first candidate image 310 is an image indicating a first hue setting value that corresponds to a first video genre. As an example, the first video genre is "dynamic". The first hue setting value is stored in advance in the first memory 14. The first candidate image 310 includes a preview image of the input image whose hue is adjusted based on the first hue setting value, and a character string "dynamic" corresponding to the first hue setting value. The first hue setting value corresponds to a "first setting value". The first candidate image 310 corresponds to a "first image".

The second candidate image 320 is an image indicating a second hue setting value that corresponds to a second video genre. As an example, the second video genre is "cinema". The second hue setting value is stored in advance in the first memory 14. The second candidate image 320 includes a preview image of the input image whose hue is adjusted based on the second hue setting value, and a character string "cinema" corresponding to the second hue setting value. The second hue setting value corresponds to a "second setting value". The second candidate image 320 corresponds to a "second image".

The third candidate image 330 is an image indicating a third hue setting value that corresponds to a third video genre. As an example, the third video genre is "drama". The third hue setting value is stored in advance in the first memory 14. The third candidate image 330 includes a preview image of the input image whose hue is adjusted based on the third hue setting value, and a character string "drama" corresponding to the third hue setting value.

The fourth candidate image 340 is an image indicating a fourth hue setting value that corresponds to a fourth video genre. As an example, the fourth video genre is "game". The fourth hue setting value is stored in advance in the first memory 14. The fourth candidate image 340 includes a preview image of the input image whose hue is adjusted based on the fourth hue setting value, and a character string "game" corresponding to the fourth hue setting value.

In FIG. 7, the first candidate image 310 to the fourth candidate image 340 are shown as monochrome images having the same hue, but in the actual first video genre selection image 300, the first candidate image 310 to the fourth candidate image 340 are color images having different hues according to the video genre.

The selection frame 350 is a rectangular frame-shaped image used to select one of the first candidate image 310 to the fourth candidate image 340. The first processor 15 recognizes a candidate image enclosed by the selection frame 350 from the first candidate image 310 to the fourth candidate image 340 as the candidate image (video genre) selected by the user.

The forward operation button 360 is an image (icon) for instructing the first processor 15 to switch the image displayed in the application window from the first video genre selection image 300 to a next brightness selection image 400. As an example, the forward operation button 360 includes a character string "next".

The return operation button 370 is an image (icon) for instructing the first processor 15 to return the image displayed in the application window from the first video genre selection image 300 to the immediately preceding adjustment method selection image 200. As an example, the return operation button 370 includes a character string "return".

The advanced setting button 380 is an image (icon) for instructing the first processor 15 to switch the image displayed in the application window from the video genre selection image 300 to an advanced setting image 700. As an example, the advanced setting button 380 includes a character string "skip to advanced settings".

As shown in FIG. 2, the first processor 15 determines, based on the first operation signal input from the first input device 11, whether a first operation for selecting the second candidate image 320 is received in a period during which the first video genre selection image 300 is displayed (step S4). In other words, the first processor 15 determines whether the first operation for selecting the second video genre "cinema" as the video genre is received. The first operation for selecting the second candidate image 320 is, for example, the user setting the selection frame 350 at a position of the second candidate image 320 and then clicking the forward operation button 360 by using the mouse 11b.

When determining that the first operation for selecting the second candidate image 320 (i.e., "cinema") is received (step S4: Yes), the first processor 15 skips processing from step S5 to step S9 to be described later, and proceeds to step S10 in the flowchart in FIG. 3. Processing in S10 and subsequent steps in the flowchart in FIG. 3 will be described later.

On the other hand, when determining that the first operation for selecting the second candidate image 320 is not received (step S4: No), the first processor 15 determines whether the first operation for selecting a candidate image other than the second candidate image 320 from the first candidate image 310 to the fourth candidate image 340 is received (step S5). In other words, the first processor 15 determines whether the first operation for selecting a video genre other than "cinema" is received.

When determining that the first operation for selecting a candidate image other than the second candidate image 320 is not received (step S5: No), the first processor 15 determines whether an operation for pressing the advanced setting button 380 is received (step S6).

When determining that the operation for pressing the advanced setting button 380 is received (step S6: Yes), the first processor 15 proceeds to step S18 in a flowchart in FIG. 4. The operation for pressing the advanced setting button 380 is, for example, the user clicking the advanced setting button 380 by using the mouse 11b. Processing in S18 and subsequent steps in the flowchart in FIG. 4 will be described later.

When determining that the operation for pressing the advanced setting button 380 is not received (step S6: No), the first processor 15 returns to step S4. Although not shown in FIG. 2, when determining that an operation for pressing the return operation button 370 is received in the period during which the first video genre selection image 300 is displayed, the first processor 15 returns to step S1 and returns the image displayed in the application window from the first video genre selection image 300 to the immediately preceding adjustment method selection image 200. The operation for pressing the return operation button 370 is, for example, the user clicking the return operation button 370 by using the mouse 11b.

When determining that the first operation for selecting a candidate image other than the second candidate image 320 is received (step S5: Yes), the first processor 15 displays an application window including the brightness selection image 400 on the first display device 12 (step S7). For example, when determining that the first operation for selecting the first candidate image 310 (i.e., "dynamic") is received, the first processor 15 displays the application window including the brightness selection image 400 on the first display device 12.

Figure 8:
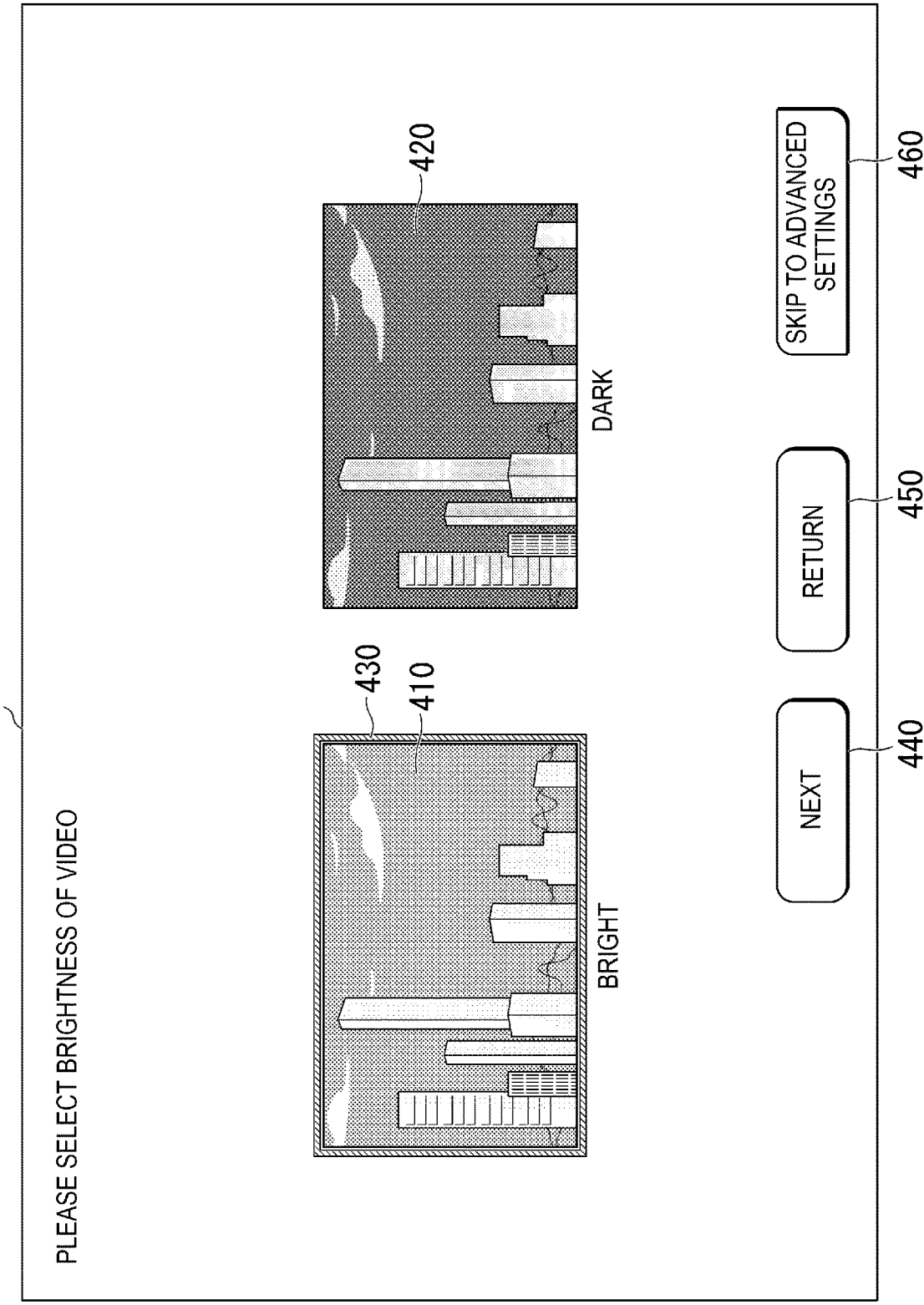
FIG. 8 is a diagram showing an example of a brightness selection image.

FIG. 8 is a diagram showing an example of the brightness selection image 400. The brightness selection image 400 is an image for requesting the user to select the brightness for the input image. The brightness selection image 400 includes a fifth candidate image 410, a sixth candidate image 420, a selection frame 430, a forward operation button 440, a return operation button 450, and an advanced setting button 460. The brightness selection image 400 corresponds to a "second setting image".

The fifth candidate image 410 is an image indicating a fifth hue setting value that corresponds to a word "bright" representing brightness. The fifth hue setting value is stored in advance in the first memory 14. The fifth candidate image 410 includes a preview image of the input image whose hue is adjusted based on the fifth hue setting value, and a character string "bright" corresponding to the fifth hue setting value. The fifth hue setting value corresponds to a "third setting value". The fifth candidate image 410 corresponds to a "third image".

The sixth candidate image 420 is an image indicating a sixth hue setting value that corresponds to a word "dark" representing brightness. The sixth hue setting value is stored in advance in the first memory 14. The sixth candidate image 420 includes a preview image of the input image whose hue is adjusted based on the sixth hue setting value, and a character string "dark" corresponding to the sixth hue setting value. The sixth hue setting value corresponds to a "fourth setting value". The sixth candidate image 420 corresponds to a "fourth image".

In FIG. 8, the fifth candidate image 410 and the sixth candidate image 420 are shown as monochrome images, but in the actual brightness selection image 400, the fifth candidate image 410 and the sixth candidate image 420 are color images having different brightness.

The selection frame 430 is a rectangular frame-shaped image used to select one of the fifth candidate image 410 and the sixth candidate image 420. The first processor 15 recognizes a candidate image enclosed by the selection frame 430 from the fifth candidate image 410 and the sixth candidate image 420 as the candidate image (brightness) selected by the user.

The forward operation button 440 is an image (icon) for instructing the first processor 15 to switch the image displayed in the application window from the brightness selection image 400 to a next adjustment color selection image 500. As an example, the forward operation button 440 includes a character string "next".

The return operation button 450 is an image (icon) for instructing the first processor 15 to return the image displayed in the application window from the brightness selection image 400 to the immediately preceding first video genre selection image 300. As an example, the return operation button 450 includes a character string "return".

The advanced setting button 460 is an image (icon) for instructing the first processor 15 to switch the image displayed in the application window from the brightness selection image 400 to the advanced setting image 700. As an example, the advanced setting button 460 includes a character string "skip to advanced settings". The advanced setting button 460 corresponds to a "fifth image".

As shown in FIG. 2, the first processor 15 determines, based on the first operation signal input from the first input device 11, whether a second operation for selecting one of the fifth candidate image 410 and the sixth candidate image 420 is received in a period during which the brightness selection image 400 is displayed (step S8). In other words, the first processor 15 determines whether the second operation for selecting either "bright" or "dark" as the brightness of the input image is received.

The second operation for selecting one of the fifth candidate image 410 and the sixth candidate image 420 is, for example, the user setting the selection frame 430 at a position of one of the fifth candidate image 410 and the sixth candidate image 420 and then clicking the forward operation button 440 by using the mouse 11b.

When determining that the second operation for selecting one of the fifth candidate image 410 and the sixth candidate image 420 is not received (step S8: No), the first processor 15 determines whether a third operation for pressing the advanced setting button 460 is received (step S9). When determining that the third operation for pressing the advanced setting button 460 is received (step S9: Yes), the first processor 15 proceeds to step S18 in the flowchart in FIG. 4. The processing in S18 and subsequent steps in the flowchart in FIG. 4 will be described later.

When determining that the third operation for pressing the advanced setting button 460 is not received (step S9: No), the first processor 15 returns to step S8. Although not shown in FIG. 2, when determining that an operation for pressing the return operation button 450 is received in the period during which the brightness selection image 400 is displayed, the first processor 15 returns to step S3 and returns the image displayed in the application window from the brightness selection image 400 to the immediately preceding first video genre selection image 300.

When determining that the second operation for selecting one of the fifth candidate image 410 and the sixth candidate image 420 is received (step S8: Yes), the first processor 15 proceeds to step S10 in the flowchart in FIG. 3.

Figure 3:
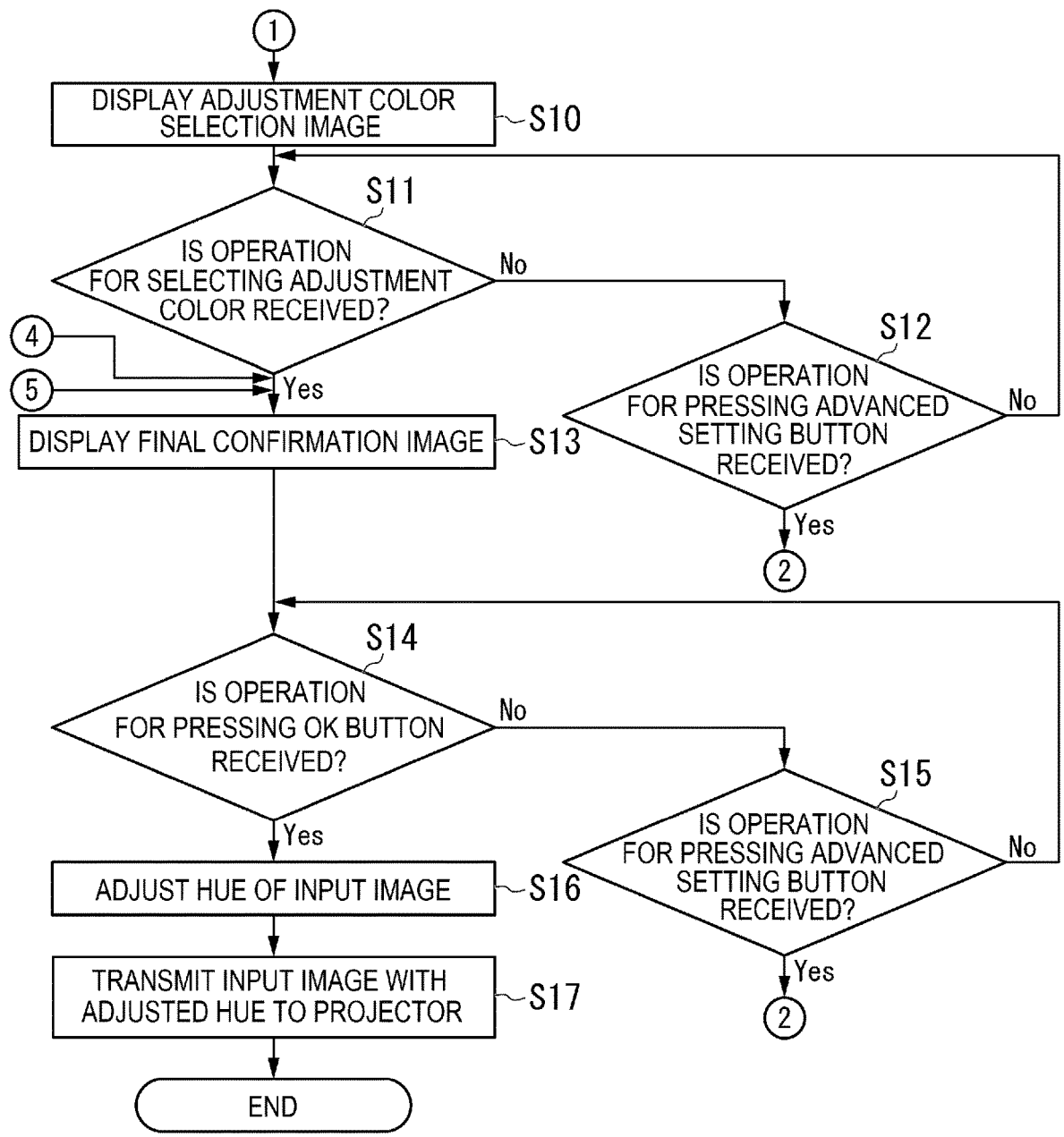
FIG. 3 is a flowchart showing the image adjustment processing executed by the first processor.

As shown in FIG. 3, when proceeding to step S10, the first processor 15 displays an application window including the adjustment color selection image 500 on the first display device 12 (step S10).

Figure 9:
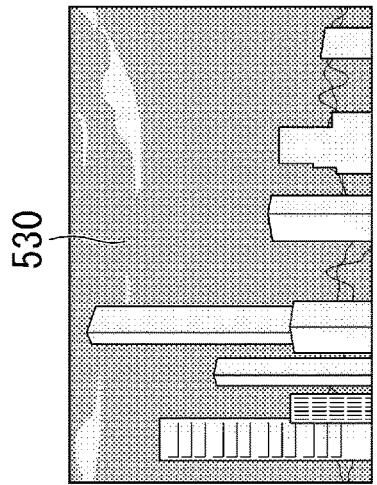
FIG. 9 is a diagram showing an example of an adjustment color selection image.

FIG. 9 is a diagram showing an example of the adjustment color selection image 500. The adjustment color selection image 500 is an image for requesting the user to select a hue to be emphasized from three hues, i.e., a red hue, a blue hue, and a green hue of the input image. The adjustment color selection image 500 includes a seventh candidate image 510, an eighth candidate image 520, a ninth candidate image 530, a selection frame 540, a forward operation button 550, a return operation button 560, and an advanced setting button 570. The adjustment color selection image 500 corresponds to a "fourth setting image".

The seventh candidate image 510 is an image indicating a seventh hue setting value for emphasizing the red hue of the input image. The seventh hue setting value is stored in advance in the first memory 14. The seventh candidate image 510 includes a preview image of the input image whose red hue is adjusted based on the seventh hue setting value, and a character string "strengthen red hue" corresponding to the seventh hue setting value.

The eighth candidate image 520 is an image indicating an eighth hue setting value for emphasizing the blue hue of the input image. The eighth hue setting value is stored in advance in the first memory 14. The eighth candidate image 520 includes a preview image of the input image whose blue hue is adjusted based on the eighth hue setting value, and a character string "strengthen blue hue" corresponding to the eighth hue setting value.

The ninth candidate image 530 is an image indicating a ninth hue setting value for emphasizing the green hue of the input image. The ninth hue setting value is stored in advance in the first memory 14. The ninth candidate image 530 includes a preview image of the input image whose green hue is adjusted based on the ninth hue setting value, and a character string "strengthen green hue" corresponding to the ninth hue setting value.

In FIG. 9, the seventh candidate image 510 to the ninth candidate image 530 are shown as monochrome images, but in the actual adjustment color selection image 500, the seventh candidate image 510 to the ninth candidate image 530 are color images in which different hues are emphasized, respectively.

The selection frame 540 is a rectangular frame-shaped image used to select one of the seventh candidate image 510 to the ninth candidate image 530. The first processor 15 recognizes a candidate image enclosed by the selection frame 540 from the seventh candidate image 510 to the ninth candidate image 530 as the candidate image (hue to be emphasized) selected by the user.

The forward operation button 550 is an image (icon) for instructing the first processor 15 to switch the image displayed in the application window from the adjustment color selection image 500 to a next final confirmation image 600. As an example, the forward operation button 550 includes a character string "next".

The return operation button 560 is an image (icon) for instructing the first processor 15 to return the image displayed in the application window from the adjustment color selection image 500 to the immediately preceding brightness selection image 400. As an example, the return operation button 560 includes a character string "return".

The advanced setting button 570 is an image (icon) for instructing the first processor 15 to switch the image displayed in the application window from the adjustment color selection image 500 to the advanced setting image 700. As an example, the advanced setting button 570 includes a character string "skip to advanced settings".

As shown in FIG. 3, the first processor 15 determines, based on the first operation signal input from the first input device 11, whether a fifth operation for selecting one of the seventh candidate image 510 to the ninth candidate image 530 is received in a period during which the adjustment color selection image 500 is displayed (step S11). In other words, the first processor 15 determines whether the fifth operation for selecting a hue to be emphasized from the three hues, i.e., the red hue, the blue hue, and the green hue of the input image is received.

The fifth operation for selecting one of the seventh candidate image 510 to the ninth candidate image 530 is, for example, the user setting the selection frame 540 at a position of one of the seventh candidate image 510 to the ninth candidate image 530 and then clicking the forward operation button 550 using the mouse 11b.

When determining that the fifth operation for selecting one of the seventh candidate image 510 to the ninth candidate image 530 is not received (step S11: No), the first processor 15 determines whether an operation for pressing the advanced setting button 570 is received (step S12). When determining that the operation for pressing the advanced setting button 570 is received (step S12: Yes), the first processor 15 proceeds to step S18 in the flowchart in FIG. 4. The processing in S18 and subsequent steps in the flowchart in FIG. 4 will be described later.

When determining that the operation for pressing the advanced setting button 570 is not received (step S12: No), the first processor 15 returns to step S11. Although not shown in FIG. 3, when determining that an operation for pressing the return operation button 560 is received in the period during which the adjustment color selection image 500 is displayed, the first processor 15 returns to step S7 and returns the image displayed in the application window from the adjustment color selection image 500 to the immediately preceding brightness selection image 400.

When determining that the fifth operation for selecting one of the seventh candidate image 510 to the ninth candidate image 530 is received (step S11: Yes), the first processor 15 displays an application window including the final confirmation image 600 on the first display device 12 (step S13).

Figure 10:
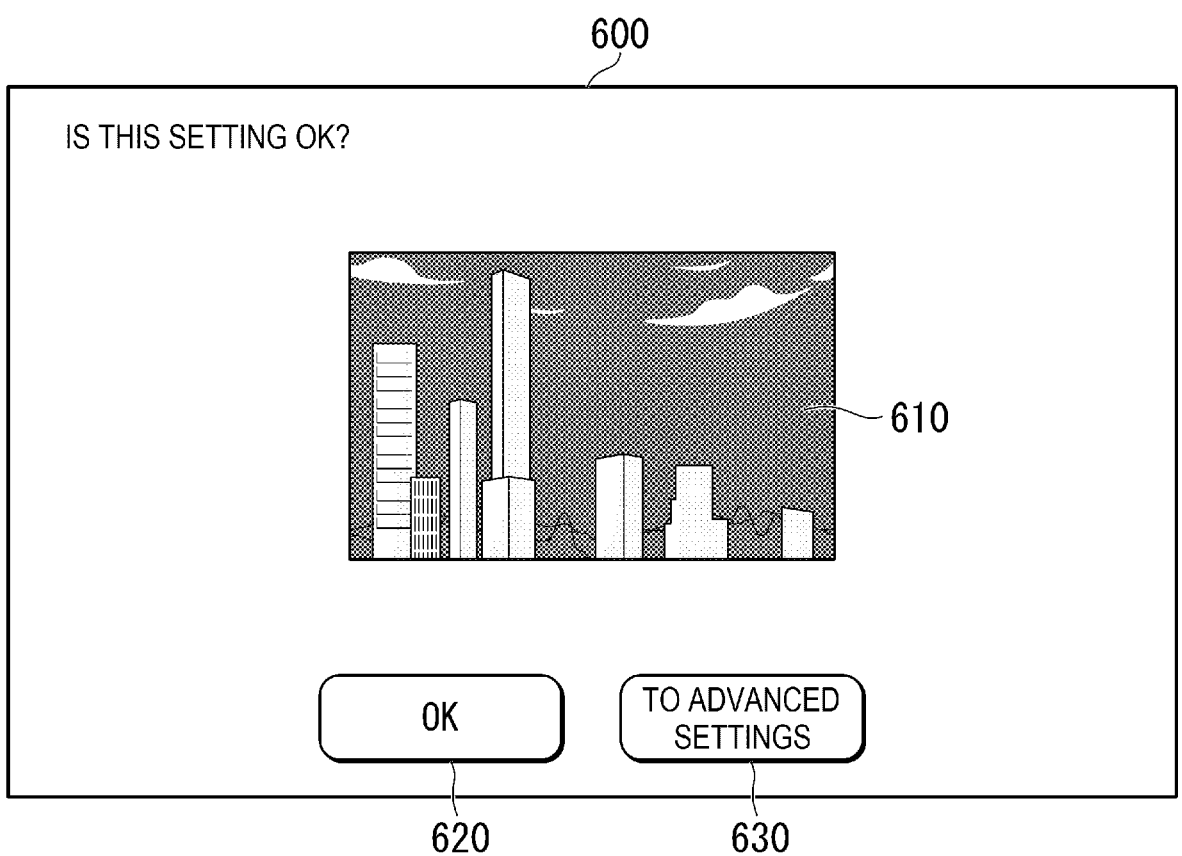
FIG. 10 is a diagram showing an example of a final confirmation image.

FIG. 10 is a diagram showing an example of the final confirmation image 600. The final confirmation image 600 is an image for the user to confirm an input image whose hue is adjusted based on the operation received from the user. The final confirmation image 600 includes a final preview image 610, an OK button 620, and an advanced setting button 630.

The final preview image 610 is a preview image of the input image whose hue is adjusted based on the operation received from the user. For example, when step S13 is executed after step S11 is executed, the final preview image 610 is a preview image of the input image whose hue is adjusted based on the first operation, the second operation, and the fifth operation.

In FIG. 10, the final preview image 610 is shown as a monochrome image, but in the actual final confirmation image 600, the final preview image 610 is a color image of the input image whose hue is adjusted based on the first operation, the second operation, and the fifth operation.

As described above, the first operation is an operation for selecting one of the first candidate image 310 to the fourth candidate image 340 in the period during which the first video genre selection image 300 is displayed. The second operation is an operation for selecting one of the fifth candidate image 410 and the sixth candidate image 420 in the period during which the brightness selection image 400 is displayed. The fifth operation is an operation for selecting one of the seventh candidate image 510 to the ninth candidate image 530 in the period during which the adjustment color selection image 500 is displayed.

The OK button 620 is an image (icon) for notifying the first processor 15 that confirmation of the final preview image 610 is completed. As an example, the OK button 620 includes a character string "OK". The OK button 620 can be rephrased as a decision button.

The advanced setting button 630 is an image (icon) for instructing the first processor 15 to switch the image displayed in the application window from the final confirmation image 600 to the advanced setting image 700. As an example, the advanced setting button 630 includes a character string "skip to advanced settings".

As shown in FIG. 3, the first processor 15 determines, based on the first operation signal input from the first input device 11, whether an operation for pressing the OK button 620 is received in a period during which the final confirmation image 600 is displayed (step S14). When determining that the operation for pressing the OK button 620 is not received (step S14: No), the first processor 15 determines whether an operation for pressing the advanced setting button 630 is received (step S15).

When determining that the operation for pressing the advanced setting button 630 is received (step S15: Yes), the first processor 15 proceeds to step S18 in the flowchart in FIG. 4. The processing in S18 and subsequent steps in the flowchart in FIG. 4 will be described later. When determining that the operation for pressing the advanced setting button 630 is not received (step S15: No), the first processor 15 returns to step S14.

When determining that the operation for pressing the OK button 620 is received (step S14: Yes), the first processor 15 adjusts the hue of the input image based on the operation received from the user (step S16). For example, when step S13 is executed after step S11 is executed, the first processor 15 adjusts the hue of the input image based on the first operation, the second operation, and the fifth operation.

Specifically, for example, in a first case where the first candidate image 310 is selected by the first operation, the fifth candidate image 410 is selected by the second operation, and the seventh candidate image 510 is selected by the fifth operation, the first processor 15 reads out the first hue setting value, the fifth hue setting value, and the seventh hue setting value from the first memory 14. The first case can be paraphrased as a case where "dynamic" is selected as the video genre of the input image by the first operation, "bright" is selected as the brightness of the input image by the second operation, and the "red hue" is selected as the hue to be emphasized by the fifth operation.

In such a first case, the first processor 15 adjusts the hue of the input image by rewriting the image data representing the input image based on the first hue setting value, the fifth hue setting value, and the seventh hue setting value.

For example, in a second case where the second candidate image 320 is selected by the first operation and the seventh candidate image 510 is selected by the fifth operation, the first processor 15 reads out the second hue setting value and the seventh hue setting value from the first memory 14. The second case can be paraphrased as a case where "cinema" is selected as the video genre of the input image by the first operation, and "red hue" is selected as the hue to be emphasized by the fifth operation.

In the second case, since "cinema" is selected as the video genre of the input image by the first operation, the processing from step S5 to step S9 is skipped. That is, in the second case, processing of displaying the brightness selection image 400 and receiving the second operation is skipped. In such a second case, the first processor 15 adjusts the hue of the input image by rewriting the image data representing the input image based on the second hue setting value and the seventh hue setting value.

After adjusting the hue of the input image as described above, the first processor 15 transmits the input image with adjusted hue to the second image display device 20 via the first communicator 13 (step S17). Specifically, in step S17, the first processor 15 transmits, to the second image display device 20 via the first communicator 13, a video signal including the image data that is rewritten based on the hue setting value read out from the first memory 14.

When receiving the video signal from the first image display device 10 via the second communicator 23, the second processor 26 of the second image display device 20 controls the second display device 22 based on the image data included in the video signal such that the image light L representing the input image with adjusted hue is projected. As a result, the input image whose hue is adjusted according to the operations performed by the user is displayed on the projection surface 100.

Figure 4:
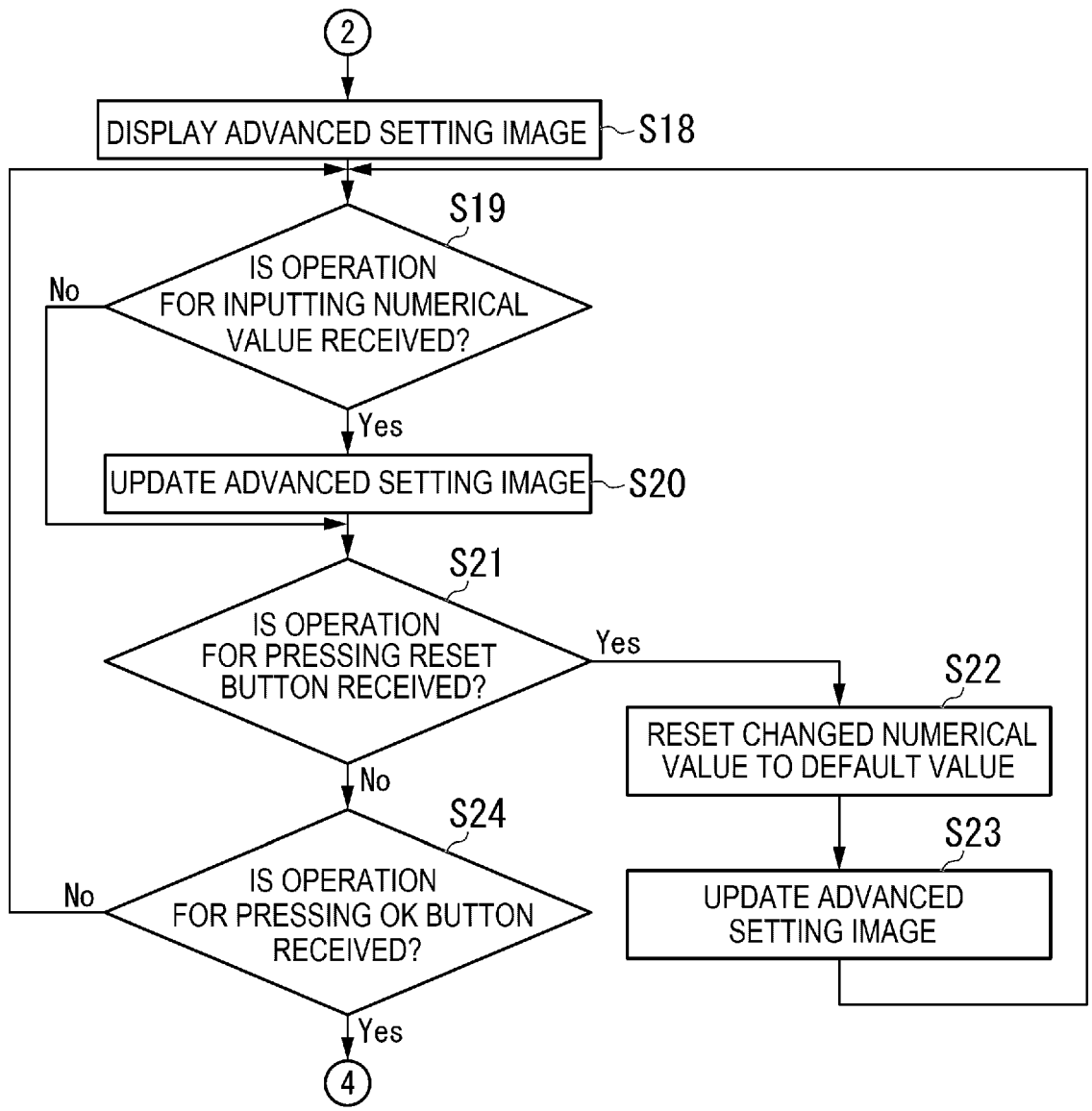
FIG. 4 is a flowchart showing the image adjustment processing executed by the first processor.

Hereinafter, the processing in S18 and subsequent steps in the flowchart in FIG. 4 will be described. As shown in FIG. 4, when proceeding to step S18, the first processor 15 displays an application window including the advanced setting image 700 on the first display device 12 (step S18).

Figure 11:
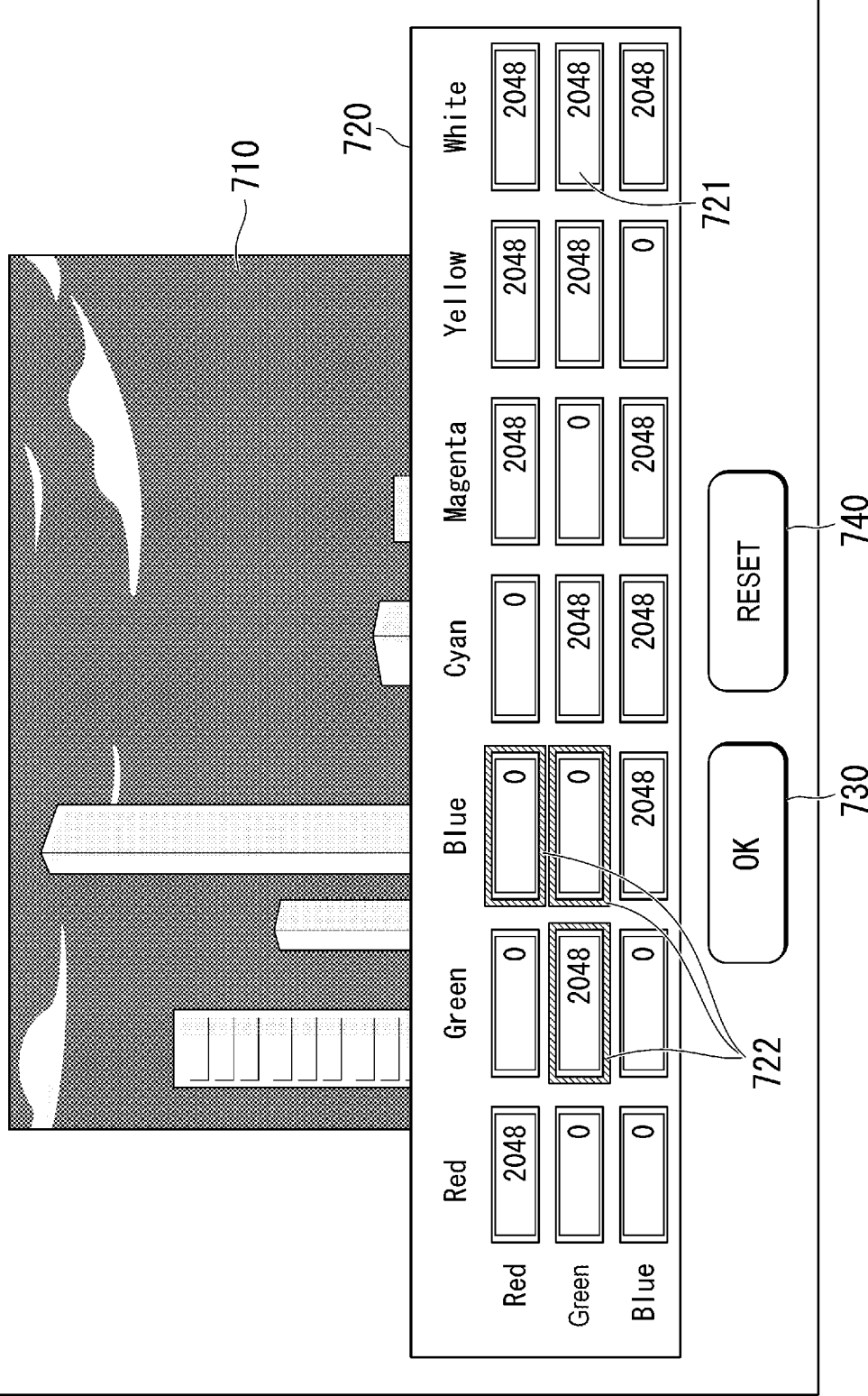
FIG. 11 is a diagram showing an example of an advanced setting image.

FIG. 11 is a diagram showing an example of the advanced setting image 700. The advanced setting image 700 is an image that provides a GUI for the user to input at least one numerical value for adjusting the input image, thereby adjusting the hue of the input image to any hue. The advanced setting image 700 includes a preview image 710, a setting value display image 720, an OK button 730, and a reset button 740. The advanced setting image 700 corresponds to a "third setting image".

The setting value display image 720 is an image that displays hue setting values determined based on an operation before the third operation for pressing anyone of the advanced setting buttons 380, 460, 570, and 630 is received. The setting value display image 720 includes a plurality of numerical value input areas 721 associated with a plurality of setting items, respectively. As an example, the plurality of setting items include setting items corresponding to seven colors, i.e., "Red", "Green", "Blue", "Cyan", "Magenta", "Yellow", and "White".

The plurality of numerical value input areas 721 indicate numerical values corresponding to the setting items that are associated with the respective numerical value input areas 721. For example, the numerical value input area 721 associated with the "Red" setting item indicates a numerical value corresponding to "Red" among numerical values included in the hue setting value determined based on the operation before the third operation is received. The numerical value input area 721 associated with the "Green" setting item indicates a numerical value corresponding to "Green" among the numerical values included in the hue setting value. The numerical value input area 721 associated with the "Blue" setting item indicates a numerical value corresponding to "Blue" among the numerical values included in the hue setting value. The numerical value shown in the numerical value input area 721 is rewritten by the user inputting a numerical value.

The numerical value input area 721 associated with the "Red" setting item corresponds to a "first numerical value input area indicating a numerical value that corresponds to a first setting item". The numerical value input area 721 associated with the "Green" setting item corresponds to a "second numerical value input area indicating a numerical value that corresponds to a second setting item". The numerical value input area 721 associated with the "Blue" setting item corresponds to a "third numerical value input area indicating a numerical value that corresponds to a third setting item".

For example, when the third operation for pressing the advanced setting button 460 included in the brightness selection image 400 is received after the first candidate image 310 is selected from the first video genre selection image 300 by the first operation, the first processor 15 reads out the first hue setting value from the first memory 14 and generates the setting value display image 720 for displaying the first hue setting value. In this case, for example, the numerical value input area 721 associated with the "Red" setting item indicates the numerical value corresponding to "Red" among the numerical values included in the first hue setting value.

For example, when the third operation for pressing the advanced setting button 460 included in the brightness selection image 400 is received after the second candidate image 320 is selected from the first video genre selection image 300 by the first operation, the first processor 15 reads out the second hue setting value from the first memory 14 and generates the setting value display image 720 for displaying the second hue setting value. In this case, for example, the numerical value input area 721 associated with the "Red" setting item indicates the numerical value corresponding to "Red" among the numerical values included in the second hue setting value.

As shown in FIG. 11, among the plurality of numerical value input areas 721 including at least the first numerical value input area, the second numerical value input area, and the third numerical value input area, numerical value input areas 722 indicating numerical values different from respective initial values thereof are displayed in a mode different from those of other numerical value input areas 721. For example, the numerical value input areas 722 indicating the numerical values different from the initial value are surrounded by rectangular frame-shaped images having a predetermined color. Alternatively, a color inside the numerical value input areas 722 indicating the numerical values different from the respective initial values thereof may be a color different from a color inside the other numerical value input areas 721. The numerical value input areas 722 indicating the numerical values different from the initial value are not limited to the display modes, and may be displayed in any display mode as long as the display mode is more conspicuous than that of the other numerical value input areas 721.

The preview image 710 is a preview image of the input image whose hue is adjusted based on the hue setting value displayed in the setting value display image 720. The OK button 730 is an image (icon) for notifying the first processor 15 that the advanced settings is completed. As an example, the OK button 730 includes a character string "OK". The reset button 740 is an image (icon) for instructing the first processor 15 to reset the hue setting value displayed in the setting value display image 720 to a default value (initial value). As an example, the reset button 740 includes a character string "reset".

In FIG. 11, the preview image 710 is shown as a monochrome image, but in the actual advanced setting image 700, the preview image 710 is a color image of the input image whose hue is adjusted based on the hue setting value displayed in the setting value display image 720.

As shown in FIG. 4, the first processor 15 determines, based on the first operation signal input from the first input device 11, whether a fourth operation for inputting at least one numerical value for adjusting the input image is received in a period during which the advanced setting image 700 is displayed (step S19). The receiving the fourth operation includes receiving an operation of rewriting the hue setting value displayed in the setting value display image 720 that is included in the advanced setting image 700.

When determining that the fourth operation is received (step S19: Yes), the first processor 15 updates the advanced setting image 700 based on the numerical value input by the fourth operation (step S20). Specifically, in step S20, the first processor 15 rewrites the hue setting value displayed in the setting value display image 720 that is included in the advanced setting image 700 to the numerical value input by the fourth operation. The first processor 15 also replaces the preview image 710 included in the advanced setting image 700 with a preview image of the input image whose hue is readjusted based on the numerical value input by the fourth operation.

After updating the advanced setting image 700 as described above, the first processor 15 proceeds to step S21. When determining that the fourth operation is not received (step S19: No), the first processor 15 skips step S20 and proceeds to step S21.

When proceeding to step S21, the first processor 15 determines whether an operation for pressing the reset button 740 is received in the period during which the advanced setting image 700 is displayed (step S21). When determining that an operation for pressing the reset button 740 is received (step S21: Yes), the first processor 15 resets the hue setting value displayed in the setting value display image 720 to the default value (initial value) (step S22).

The first processor 15 updates the advanced setting image 700 based on the hue setting value reset to the default value (step S23). Specifically, in step S23, the first processor 15 rewrites the hue setting value displayed in the setting value display image 720 that is included in the advanced setting image 700 to the default value. The first processor 15 also replaces the preview image 710 included in the advanced setting image 700 with a preview image of the input image whose hue is readjusted based on the hue setting value reset to the default value. After step S23 ends, the first processor 15 returns to step S19.

On the other hand, when determining that the operation for pressing the reset button 740 is not received (step S21: No), the first processor 15 determines whether an operation for pressing the OK button 730 is received (step S24). When determining that the operation for pressing the OK button 730 is not received (step S24: No), the first processor 15 returns to step S19. When determining that the operation for pressing the OK button 730 is received (step S24: Yes), the first processor 15 proceeds to step S13 in the flowchart in FIG. 3.

When proceeding to step S13, the first processor 15 displays the application window including the final confirmation image 600 on the first display device 12 as already described. When the first processor 15 proceeds from step S24 to step S13, the final preview image 610 included in the final confirmation image 600 is a preview image of the input image whose hue is adjusted based on the hue setting value displayed in the setting value display image 720 when the OK button 730 is pressed in the period during which the advanced setting image 700 is displayed.

Hereinafter, processing executed by the first processor 15 when an operation for selecting the second option image 220 is received in the period during which the adjustment method selection image 200 is displayed will be described.

As shown in FIG. 2, when determining that the operation for selecting the second selection option image 220 is received in the period during which the adjustment method selection image 200 is displayed (step S2: No), the first processor 15 proceeds to step S25 in a flowchart in FIG. 5. In other words, when determining that the operation for selecting the second option "load professional data" as the hue adjustment method is received, the first processor 15 proceeds to step S25. The operation for selecting the second option image 220 is, for example, the user clicking the second option image 220 by using the mouse 11b.

Figure 5:
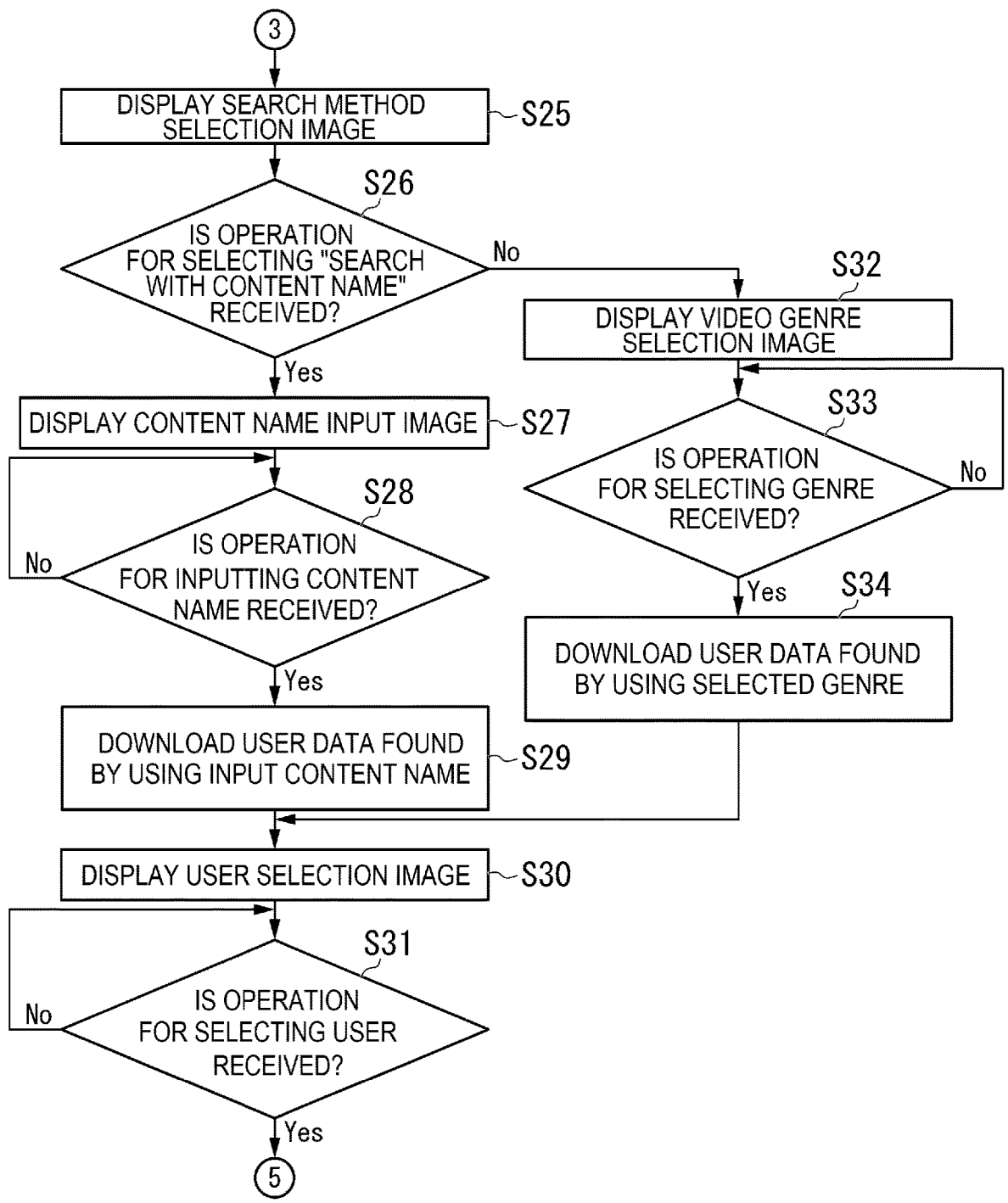
FIG. 5 is a flowchart showing the image adjustment processing executed by the first processor.

As shown in FIG. 5, when proceeding to step S25, the first processor 15 displays an application window including a search method selection image 800 on the first display device 12 (step S25).

Figure 12:
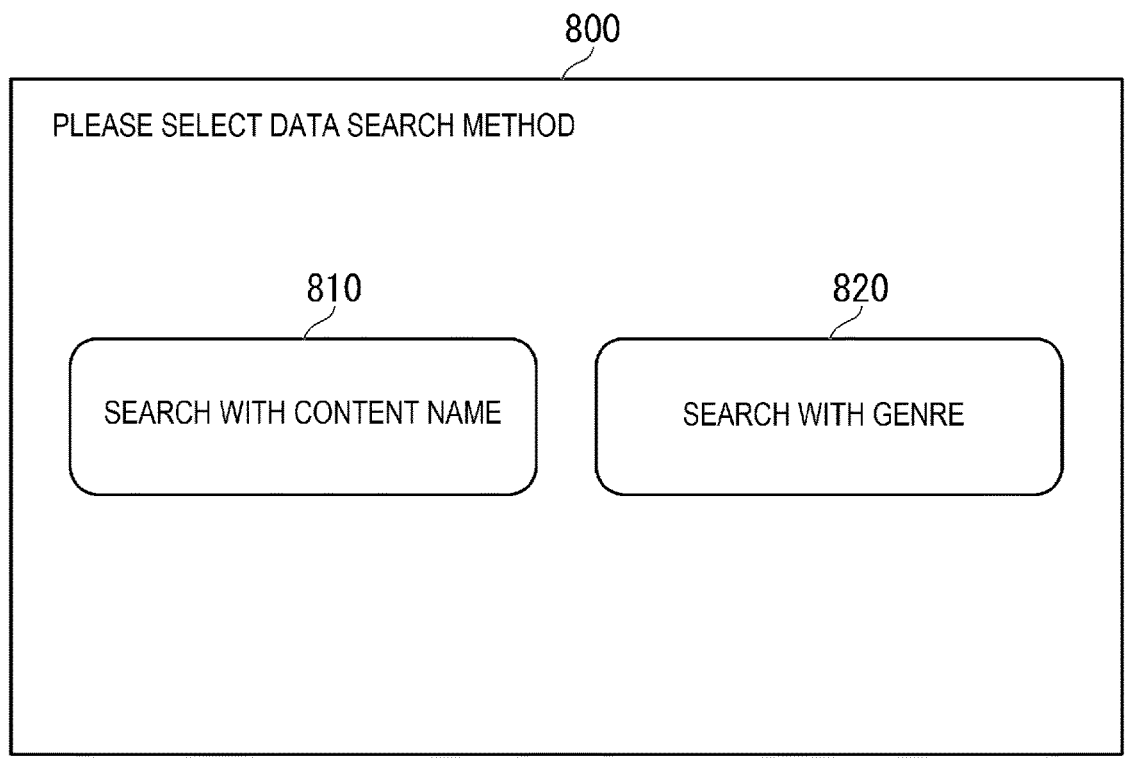
FIG. 12 is a diagram showing an example of a search method selection image.

FIG. 12 is a diagram showing an example of the search method selection image 800. The search method selection image 800 is an image for requesting the user to select a search method for professional user data (a hue setting value). The search method selection image 800 includes a first option image 810 indicating a first option and a second option image 820 indicating a second option.

The first option image 810 includes a character string corresponding to the first option. As an example, the character string corresponding to the first option is "search with content name". As to be described below, when an operation for selecting the first option image 810 is received, the first processor 15 executes processing to search for professional user data based on a content name input by the user.

The second option image 820 includes a character string corresponding to the second option. As an example, the character string corresponding to the second option is "search with genre". As to be described below, when an operation for selecting the second option image 820 is received, the first processor 15 executes processing to search for professional user data based on a video genre selected by the user.

As shown in FIG. 5, the first processor 15 determines, based on the first operation signal input from the first input device 11, whether the operation for selecting the first option image 810 is received in a period during which the search method selection image 800 is displayed (step S26). In other words, the first processor 15 determines whether an operation for selecting the first option "search with content name" as the search method is received.

When determining that the operation for selecting the first option image 810 is received (step S26: Yes), the first processor 15 displays an application window including a content name input image 900 on the first display device 12 (step S27). The operation for selecting the first option image 810 is, for example, the user clicking the first option image 810 by using the mouse 11b.

Figure 13:
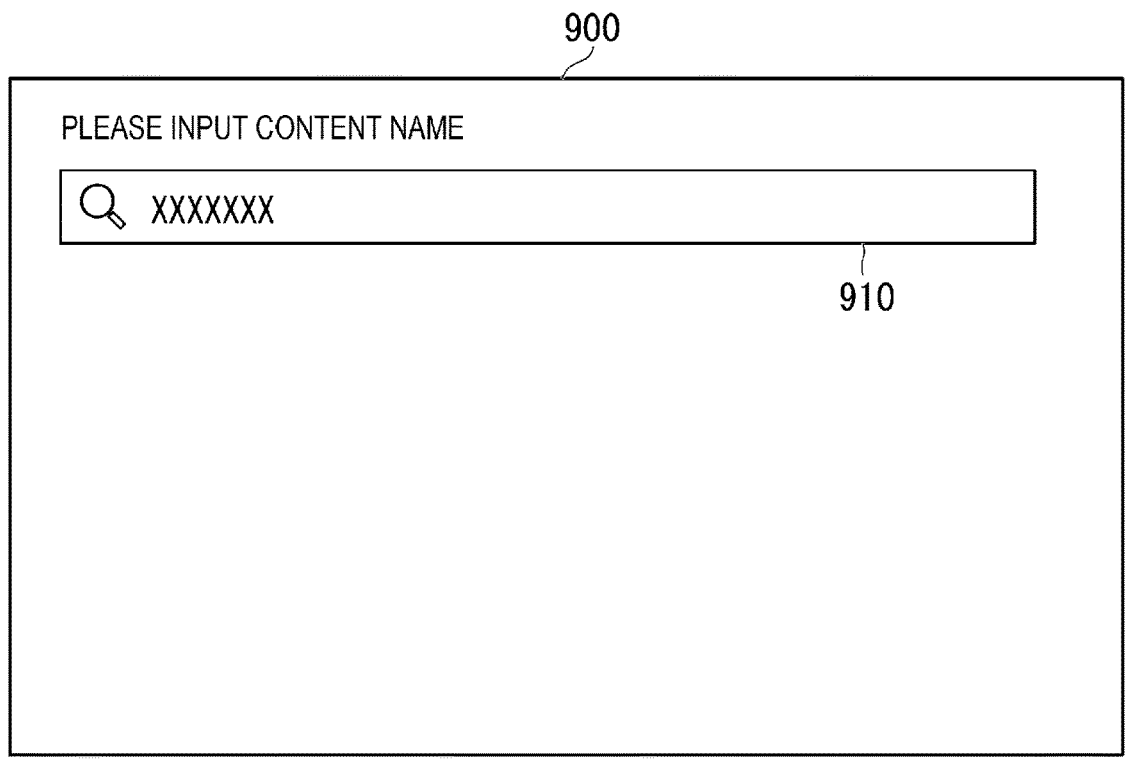
FIG. 13 is a diagram showing an example of a content name input image.

FIG. 13 is a diagram showing an example of the content name input image 900. The content name input image 900 is an image for requesting the user to input a content name. The content name input image 900 includes a character input area 910 for inputting the content name.

As shown in FIG. 5, the first processor 15 determines, based on the first operation signal input from the first input device 11, whether an operation for inputting the content name is received in a period during which the content name input image 900 is displayed (step S28). When determining that the operation for inputting the content name is not received (step S28: No), the first processor 15 repeats step S28 until the operation for inputting the content name is received.

On the other hand, when determining that the operation for inputting the content name is received (step S28: Yes), the first processor 15 accesses the Internet via the first communicator 13, and downloads, from the Internet server, a plurality of pieces of professional user data found by using the input content name (step S29).

After downloading the plurality of pieces of professional user data, the first processor 15 displays an application window including a user selection image 1000 on the first display device 12 (step S30).

FIG. 14 is a diagram showing an example of the user selection image 1000. The user selection image 1000 is an image for requesting the user to select one piece of the plurality of pieces of professional user data. The user selection image 1000 includes a first user candidate image 1010, a second user candidate image 1020, a selection frame 1030, and a decision button 1040.

The first user candidate image 1010 is a preview image of the input image whose hue is adjusted based on data (a hue setting value) of a professional user named "AAAA". The second user candidate image 1020 is a preview image of the input image whose hue is adjusted based on data (a hue setting value) of a professional user named "BBBB". As an example, in the user selection image 1000, the first user candidate image 1010 and the second user candidate image 1020 are displayed in a ranking format. The data of the professional user named "AAAA" is ranked first. The data of the professional user named "BBBB" is ranked second. The ranking is set, for example, in descending order of cumulative amounts selected by users who have used the image display system 1 so far.

In FIG. 14, the first user candidate image 1010 and the second user candidate image 1020 are shown as monochrome images, but in the actual user selection image 1000, the first user candidate image 1010 and the second user candidate image 1020 are color images of input images whose hues are adjusted based on different professional user data, respectively.

The selection frame 1030 is a rectangular frame-shaped image used to select one of the first user candidate image 1010 and the second user candidate image 1020. The first processor 15 recognizes a user candidate image enclosed by the selection frame 1030 from the first user candidate image 1010 and the second user candidate image 1020 as the user candidate image (professional user data) selected by the user.

The decision button 1040 is an image (icon) for notifying the first processor 15 that the professional user data used as the hue setting value of the input image is determined. As an example, the decision button 1040 includes a character string "decision".

As shown in FIG. 5, the first processor 15 determines, based on the first operation signal input from the first input device 11, whether an operation for selecting one of the first user candidate image 1010 and the second user candidate image 1020 is received in a period during which the user selection image 1000 is displayed (step S31). In other words, the first processor 15 determines whether the operation for selecting one of the professional user named "AAAA" and the professional user named "BBBB" is received.

The operation for selecting one of the first user candidate image 1010 and the second user candidate image 1020 is, for example, the user setting the selection frame 1030 at a position of one of the first user candidate image 1010 and the second user candidate image 1020 and then clicking the decision button 1040 by using the mouse 11*b*.

When determining that the operation for selecting one of the first user candidate image 1010 and the second user candidate image 1020 is not received (step S31: No), the first processor 15 repeats processing in step S31 until the operation for selecting one of the first user candidate image 1010 and the second user candidate image 1020 is received.

On the other hand, when determining that the operation for selecting one of the first user candidate image 1010 and the second user candidate image 1020 is received (step S31: Yes), the first processor 15 proceeds to step S13 in the flowchart in FIG. 3.

When proceeding to step S13, the first processor 15 displays the application window including the final confirmation image 600 on the first display device 12 as already described. When the first processor 15 proceeds from step S31 to step S13, the final preview image 610 included in the final confirmation image 600 is a preview image of the input image whose hue is adjusted based on the professional user data (hue setting value) selected in the period during which the user selection image 1000 is displayed.

When determining that the operation for selecting the first option image 810 is not received in the period during which the search method selection image 800 is displayed (step S26: No), the first processor 15 proceeds to step S32. In other words, when determining that the operation for selecting the second option image 820 is received in the period during which the search method selection image 800 is displayed, the first processor 15 proceeds to step S32.

In other words, when determining that the operation for selecting the second option "search with genre name" as the search method is received, the first processor 15 proceeds to step S32. The operation for selecting the second option image 820 is, for example, the user clicking the second option image 820 by using the mouse 11*b*.

When proceeding to step S32, the first processor 15 displays an application window including the second video genre selection image 1100 on the first display device 12 (step S32).

Figure 15:
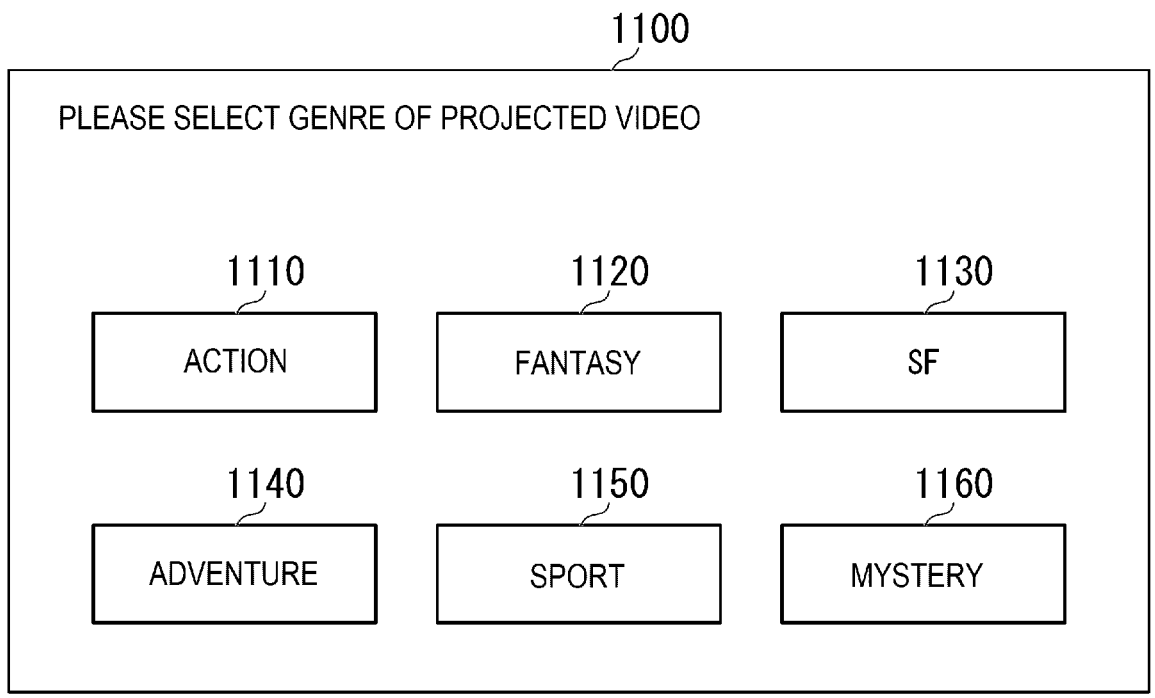
FIG. 15 is a diagram showing an example of a second video genre selection image.

FIG. 15 is a diagram showing an example of the second video genre selection image 1100. The second video genre selection image 1100 is an image for requesting the user to select a genre name to be searched for. The second video genre selection image 1100 includes a first genre selection button 1110, a second genre selection button 1120, a third genre selection button 1130, a fourth genre selection button 1140, a fifth genre selection button 1150, and a sixth genre selection button 1160.

The first genre selection button 1110 is an image (icon) for notifying the first processor 15 that "action" is selected as the genre name. As an example, the first genre selection button 1110 includes a character string "action". The second genre selection button 1120 is an image (icon) for notifying the first processor 15 that "fantasy" is selected as the genre name. As an example, the second genre selection button 1120 includes a character string "fantasy".

The third genre selection button 1130 is an image (icon) for notifying the first processor 15 that "SF" is selected as the genre name. As an example, the third genre selection button 1130 includes a character string "SF". The fourth genre selection button 1140 is an image (icon) for notifying the first processor 15 that "adventure" is selected as the genre name. As an example, the fourth genre selection button 1140 includes a character string "adventure".

The fifth genre selection button 1150 is an image (icon) for notifying the first processor 15 that "sport" is selected as the genre name. As an example, the fifth genre selection button 1150 includes a character string "sport". The sixth genre selection button 1160 is an image (icon) for notifying the first processor 15 that "mystery" is selected as the genre name. As an example, the sixth genre selection button 1160 includes a character string "mystery".

As shown in FIG. 5, the first processor 15 determines, based on the first operation signal input from the first input device 11, whether an operation for pressing one of the first genre selection button 1110 to the sixth genre selection button 1160 is received in a period during which the second video genre selection image 1100 is displayed (step S33). In other words, the first processor 15 determines whether the operation for selecting a genre name to be searched for is received.

The operation for pressing one of the first genre selection button 1110 to the sixth genre selection button 1160 is, for example, the user clicking one of the first genre selection button 1110 to the sixth genre selection button 1160 by using the mouse 11*b*.

When determining that the operation for pressing one of the first genre selection button 1110 to the sixth genre selection button 1160 is not received (step S33: No), the first processor 15 repeats processing in step S33 until the operation for pressing one of the first genre selection button 1110 to the sixth genre selection button 1160 is received.

On the other hand, when determining that the operation for pressing one of the first genre selection button 1110 to the sixth genre selection button 1160 is received (step S33: Yes), the first processor 15 accesses the Internet via the first communicator 13, and downloads, from the Internet server, a plurality of pieces of professional user data found by using the selected genre name (step S34). After step S34 ends, the first processor 15 proceeds to step S30 described above.

Effects of Embodiment

By the operation of the image display system 1 described above, the image display method according to the embodiment can be implemented. That is, the image display method according to the embodiment includes: displaying the first video genre selection image 300 (first setting image) including the first candidate image 310 (first image) that indicates the first hue setting value (first setting value) and the second candidate image 320 (second image) that indicates the second hue setting value (second setting value); receiving the first operation for selecting one of the first candidate image 310 and the second candidate image 320; displaying, when the first operation is received, the brightness selection image 400 (second setting image) including the fifth candidate image 410 (third image) that indicates the fifth hue setting value (third setting value) and the sixth candidate image 420 (fourth image) that indicates the sixth hue setting value (fourth setting value); receiving the second operation for selecting one of the fifth candidate image 410 and the sixth candidate image 420; and displaying the input image adjusted based on the first operation and the second operation.

According to the image display method of the embodiment as described above, the user can finely adjust the input image to have a desired hue by performing two-stage work including at least selecting one of the first candidate image 310 and the second candidate image 320 from the first video genre selection image 300 and selecting one of the fifth candidate image 410 and the sixth candidate image 420 from the brightness selection image 400.

Therefore, according to the image display method of the embodiment, a GUI capable of responding to the user request to adjust the video in more detail in an intuitive manner can be provided, thereby improving the user convenience.

In the image display method according to the embodiment, the brightness selection image 400 (second setting image) further includes the advanced setting button 460 (fifth image), and the image display method further includes: receiving the third operation for selecting the advanced setting button 460 in the period during which the brightness selection image 400 is displayed; receiving, when the third operation is received, the fourth operation for inputting at least one numerical value for adjusting the input image; and displaying the input image adjusted based on the numerical value input by the fourth operation.

According to such an image display method, a GUI for the user to adjust the hue of the input image to any hue by inputting at least one numerical value for adjusting the input image can be provided.

The image display method according to the embodiment further includes: displaying the first hue setting value (first setting value) when the third operation is received after the first candidate image 310 (first image) is selected by the first operation; and displaying the second hue setting value (second setting value) when the third operation is received after the second candidate image 320 (second image) is selected by the first operation. The receiving the fourth operation includes receiving the operation for rewriting the first hue setting value when the third operation is received after the first candidate image 310 is selected by the first operation, and receiving the operation for rewriting the second hue setting value when the third operation is received after the second candidate image 320 is selected by the first operation.

According to such an image display method, since the hue setting value determined based on the first operation before the third operation for pressing the advanced setting button 460 is received is displayed, the user can easily grasp the specific numerical value of the hue setting value determined at the time of performing the third operation. As a result, the user convenience when the user performs the fourth operation for rewriting the displayed hue setting value can be improved.

The image display method according to the embodiment further includes: displaying, when the third operation is received, the advanced setting image 700 (third setting image) including the first numerical value input area that indicates the numerical value corresponding to the first setting item, the second numerical value input area that indicates the numerical value corresponding to the second setting item, and the third numerical value input area that indicates the numerical value corresponding to the third setting item. Among the first numerical value input area, the second numerical value input area, and the third numerical value input area, the numerical value input area indicating the numerical value that is different from the initial value is displayed in a mode different from those of other numerical value input areas.

According to such an image display method, the user can easily recognize the numerical value different from the initial value among the numerical values included in the hue setting value determined at the time of performing the third operation. As a result, the user convenience when the user performs the fourth operation for rewriting the displayed hue setting value can be improved.

The image display method according to the embodiment further includes: displaying the brightness selection image 400 (second setting image) when the first candidate image 310 (first image) is selected by the first operation; displaying the adjustment color selection image 500 (fourth setting image) when the second operation is received; and displaying the adjustment color selection image 500 when the second candidate image 320 (second image) is selected by the first operation.

For example, as described above, when the first operation for selecting the second candidate image 320, that is, the first operation for selecting "cinema" as the video genre is received, the hue of the input image is adjusted to be dark based on the second hue setting value. In this case, it is not necessary to display the brightness selection image 400 and for the user to select the brightness for the input image.

Therefore, according to the image display method described above, when the first operation for selecting the second candidate image 320 is received, the brightness selection image 400 is skipped for displaying and the adjustment color selection image 500 is displayed, and thus user work efficiency can be improved.

In the image display method according to the embodiment, the first candidate image 310 (first image) includes a preview image of the input image adjusted based on the first hue setting value (first setting value).

According to such an image display method, the user can visually grasp how the hue of the input image is adjusted based on the first hue setting value, and thus the user convenience can be improved.

In the image display method according to the embodiment, the first candidate image 310 (first image) includes a character string ("dynamic") corresponding to the first hue setting value (first setting value).

According to such an image display method, the user can visually grasp how the hue of the input image is adjusted based on the first hue setting value, and thus the user convenience can be improved.

The image display method according to the embodiment further includes: displaying the adjustment method selection image 200 (selection image) including the first option image 210 (sixth image) that indicates the first option and the second option image 220 (seventh image) that indicates the second option before displaying the first video genre selection image 300 (first setting image); displaying the first video genre selection image 300 when the operation for selecting the first option image 210 is received; and receiving the hue setting value for adjusting the input image from the server when the operation for selecting the second option image 220 is received.

According to such an image display method, the first option and the second option can be presented to the user as the adjustment method of the input image, and thus the user convenience can be improved.

The image display system 1 according to the embodiment includes: the first image display device 10; and the second image display device 20 different from the first image display device 10. The first image display device 10 includes the first display device 12 configured to display an image, and the first processor 15 configured to control the first display device 12. The second image display device 20 includes the second display device 22 configured to display an image, and the second processor 26 configured to control the second display device 22. The first processor 15 is configured to display the first video genre selection image 300 (first setting image) including the first candidate image 310 (first image) that indicates the first hue setting value (first setting value) and the second candidate image 320 (second image) that indicates the second hue setting value (second setting value) on the first display device 12, receive the first operation for selecting one of the first candidate image 310 and the second candidate image 320, display, when the first operation is received, the brightness selection image 400 (second setting image) including the fifth candidate image 410 (third image) that indicates the fifth hue setting value (third setting value) and the sixth candidate image 420 (fourth image) that indicates the sixth hue setting value (fourth setting value), and receive the second operation for selecting one of the fifth candidate image 410 and the sixth candidate image 420. The second processor 26 is configured to display the input image adjusted based on the first operation and the second operation on the second display device 22.

According to the image display system 1 of the embodiment, a GUI capable of responding to the user request to adjust the video in more detail in an intuitive manner can be provided, thereby improving the user convenience.

Second Embodiment

Next, a second embodiment according to the present disclosure will be described.

In the second embodiment, a configuration of the image display system 1 is the same as that of the first embodiment. In the second embodiment, since an operation of the image display system 1 is different from that of the first embodiment, the operation of the image display system 1 in the second embodiment will be described below. In the following description, the same contents as those described in the first embodiment will be omitted.

As shown in FIG. 2, when starting image adjustment processing, the first processor 15 first displays an application window including the adjustment method selection image 200 on the first display device 12 as a GUI (step S1).

The first processor 15 determines, based on a first operation signal input from the first input device 11, whether an operation for selecting the first option image 210 is received in a period during which the adjustment method selection image 200 is displayed (step S2).

When determining that the operation for selecting the first option image 210 is received (step S2: Yes), the first processor 15 skips processing from step S3 to step S6 in a flowchart in FIG. 2, and displays an application window including the brightness selection image 400 on the first display device 12 (step S7). As described above, in the second embodiment, the processing from step S3 to step S6 in the flowchart in FIG. 2 is omitted.

On the other hand, when determining that the operation for selecting the first option image 210 is not received in the period during which the adjustment method selection image 200 is displayed (step S2: No), the first processor 15 proceeds to step S25 in a flowchart in FIG. 5. That is, when determining that an operation for selecting the second selection option image 220 is received, the first processor 15 proceeds to step S25. In other words, when determining that the operation for selecting a second option "load professional data" as a hue adjustment method is received, the first processor 15 proceeds to step S25.

The first processor 15 determines, based on the first operation signal input from the first input device 11, whether a second operation for selecting one of the fifth candidate image 410 and the sixth candidate image 420 is received in a period during which the brightness selection image 400 is displayed (step S8). In other words, the first processor 15 determines whether the second operation for selecting either "bright" or "dark" as brightness of an input image is received.

When determining that the second operation for selecting one of the fifth candidate image 410 and the sixth candidate image 420 is not received (step S8: No), the first processor 15 determines whether a third operation for pressing the advanced setting button 460 is received (step S9). When determining that the third operation for pressing the advanced setting button 460 is received (step S9: Yes), the first processor 15 proceeds to step S18 in a flowchart in FIG. 4.

When determining that the third operation for pressing the advanced setting button 460 is not received (step S9: No), the first processor 15 returns to step S8. Although not shown in FIG. 2, when determining that an operation for pressing the return operation button 450 is received in the period during which the brightness selection image 400 is displayed, the first processor 15 returns to step S1 and returns an image displayed in the application window from the brightness selection image 400 to the immediately preceding adjustment method selection image 200.

When determining that the second operation for selecting one of the fifth candidate image 410 and the sixth candidate image 420 is received (step S8: Yes), the first processor 15 proceeds to step S10 in the flowchart in FIG. 3.

As shown in FIG. 3, when proceeding to step S10, the first processor 15 displays an application window including the adjustment color selection image 500 on the first display device 12 (step S10).

The first processor 15 determines, based on the first operation signal input from the first input device 11, whether a fifth operation for selecting one of the seventh candidate image 510 to the ninth candidate image 530 is received in a period during which the adjustment color selection image 500 is displayed (step S11). In other words, the first processor 15 determines whether the fifth operation for selecting a hue to be emphasized from three hues, i.e., a red hue, a blue hue, and a green hue of the input image is received.

When determining that the fifth operation for selecting one of the seventh candidate image 510 to the ninth candidate image 530 is not received (step S11: No), the first processor 15 determines whether an operation for pressing the advanced setting button 570 is received (step S12). When determining that the operation for pressing the advanced setting button 570 is received (step S12: Yes), the first processor 15 proceeds to step S18 in the flowchart in FIG. 4.

When determining that the operation for pressing the advanced setting button 570 is not received (step S12: No), the first processor 15 returns to step S11. Although not shown in FIG. 3, when determining that an operation for pressing the return operation button 560 is received in the period during which the adjustment color selection image 500 is displayed, the first processor 15 returns to step S7 and returns the image displayed in the application window from the adjustment color selection image 500 to the immediately preceding brightness selection image 400.

When determining that the fifth operation for selecting one of the seventh candidate image 510 to the ninth candidate image 530 is received (step S11: Yes), the first processor 15 displays an application window including the final confirmation image 600 on the first display device 12 (step S13).

The first processor 15 determines, based on the first operation signal input from the first input device 11, whether an operation for pressing the OK button 620 is received in a period during which the final confirmation image 600 is displayed (step S14). When determining that the operation for pressing the OK button 620 is not received (step S14: No), the first processor 15 determines whether an operation for pressing the advanced setting button 630 is received (step S15).

When determining that the operation for pressing the advanced setting button 630 is received (step S15: Yes), the first processor 15 proceeds to step S18 in the flowchart in FIG. 4. When determining that the operation for pressing the advanced setting button 630 is not received (step S15: No), the first processor 15 returns to step S14.

When determining that the operation for pressing the OK button 620 is received (step S14: Yes), the first processor 15 adjusts the hue of the input image based on the operation received from a user (step S16). For example, when step S13 is executed after step S11 is executed, the first processor 15 adjusts the hue of the input image based on the second operation and the fifth operation.

Specifically, for example, when the fifth candidate image 410 is selected by the second operation and the seventh candidate image 510 is selected by the fifth operation, the first processor 15 reads out a fifth hue setting value and a seventh hue setting value from the first memory 14. This case can be paraphrased as a case where "bright" is selected as the brightness of the input image by the second operation, and "red hue" is selected as the hue to be emphasized by the fifth operation. In such a case, the first processor 15 adjusts the hue of the input image by rewriting image data representing the input image based on the fifth hue setting value and the seventh hue setting value.

After adjusting the hue of the input image as described above, the first processor 15 transmits the input image with adjusted hue to the second image display device 20 via the first communicator 13 (step S17). Specifically, in step S17, the first processor 15 transmits, to the second image display device 20 via the first communicator 13, a video signal including the image data that is rewritten based on the hue setting value read out from the first memory 14.

When receiving the video signal from the first image display device 10 via the second communicator 23, the second processor 26 of the second image display device 20 controls the second display device 22 based on the image data included in the video signal such that the image light L representing the input image with adjusted hue is projected. As a result, the input image whose hue is adjusted according to the operation by the user is displayed on the projection surface 100.

In the second embodiment, since contents of processing from step S18 to step S24 in the flowchart in FIG. 4 and processing from step S25 to step S34 in the flowchart in FIG. 5 are the same as those in the first embodiment, the description of these processing will be omitted.

Although the embodiments of the present disclosure have been described above, the technical scope of the present disclosure is not limited to the above embodiments, and various modifications can be made without departing from the spirit of the present disclosure. Hereinafter, modifications of the present disclosure will be described.

(1) In the above embodiment, an aspect is described as an example in which the displaying the first video genre selection image 300 (first setting image) is performed by the first image display device 10, the displaying the adjusted input image is performed by the second image display device 20, and the first image display device 10 displays the application window (fifth setting image) including the first video genre selection image 300 and various icons (eighth image) such as an icon for closing the application window.

The present disclosure is not limited to the above aspect, and an aspect may be adopted in which the displaying the first setting image is performed by a first image display device and a second image display device different from the first image display device, the displaying the adjusted input image is performed by the second image display device, and the first image display device displays the fifth setting image including the first setting image and the eighth image.

(2) In the above embodiment, an aspect is described as an example in which the first image display device 10 adjusts the input image based on the operation performed by the user, and the second image display device 20 displays the input image adjusted by the first image display device 10.

The present disclosure is not limited to the above aspect, and an aspect may be adopted in which one image display device has a function of adjusting the input image based on the operation performed by the user and a function of displaying the adjusted input image.

When the aspect is adopted, the image display device includes a display device configured to display an image, and a processor configured to control the display device. The processor displays a first setting image including a first image that indicates a first setting value and a second image that indicates a second setting value on the display device; receives a first operation for selecting one of the first image and the second image; displays, when the first operation is received, a second setting image including a third image that indicates a third setting value and a fourth image that indicates a fourth setting value on the display device; receives a second operation for selecting one of the third image and the fourth image; and displays an input image adjusted based on the first operation and the second operation on the display device.

For example, the image display device is a projector such as the second image display device 20. When the image display device is a projector, the display device is a projection device such as the second display device 22. The processor executes both processing executed by the first processor 15 and processing executed by the second processor 26.

(3) In the above embodiment, the second image display device 20 which is a projector is shown as an example, but the second image display device according to the present disclosure is not limited to a projector. For example, the second image display device may be a self-luminous display device such as a monitor or a liquid crystal television, such as a liquid crystal display device that displays an image on a liquid crystal display panel or a display device that displays an image on an organic EL panel. The second image display device according to the present disclosure may be an information processing device having an image display function, such as a desktop PC, a notebook PC, a tablet terminal, or a smartphone.

(4) In the above embodiment, an aspect is described as an example in which the first image display device 10 receives the hue setting value for adjusting the hue of the input image from the Internet server when the operation for selecting the second option image 220 is received in the period during which the adjustment method selection image 200 is displayed.

For example, the first image display device 10 may have a function of uploading, to the Internet server, a hue setting value set by a user.

The image display method according to one aspect of the present disclosure may have the following configuration.

The image display method according to the aspect of the present disclosure includes: displaying a first setting image including a first image that indicates a first setting value and a second image that indicates a second setting value; receiving a first operation for selecting one of the first image and the second image; displaying, when the first operation is received, a second setting image including a third image that indicates a third setting value and a fourth image that indicates a fourth setting value; receiving a second operation for selecting one of the third image and the fourth image; and displaying an input image adjusted based on the first operation and the second operation.

In the image display method according to the above aspect of the present disclosure, the second setting image may further include a fifth image, and the image display method may further include: receiving a third operation for selecting the fifth image in a period during which the second setting image is displayed; receiving, when the third operation is received, a fourth operation for inputting at least one numerical value for adjusting the input image; and displaying the input image adjusted based on the numerical value input by the fourth operation.

The image display method according to the above aspect of the present disclosure may further include: displaying the first setting value when the third operation is received after the first image is selected by the first operation; and displaying the second setting value when the third operation is received after the second image is selected by the first operation, in which the receiving the fourth operation includes receiving an operation for rewriting the first setting value when the third operation is received after the first image is selected by the first operation, and receiving an operation for rewriting the second setting value when the third operation is received after the second image is selected by the first operation.

The image display method according to the above aspect of the present disclosure may further include: displaying, when the third operation is received, a third setting image including a first numerical value input area that indicates a numerical value corresponding to a first setting item, a second numerical value input area that indicates a numerical value corresponding to a second setting item, and a third numerical value input area that indicates a numerical value corresponding to a third setting item, in which among the first numerical value input area, the second numerical value input area, and the third numerical value input area, a numerical value input area indicating the numerical value that is different from an initial value thereof is displayed in a mode different from those of other numerical value input areas.

The image display method according to the above aspect of the present disclosure may further include: displaying the second setting image when the first image is selected by the first operation; displaying a fourth setting image when the second operation is received; and displaying the fourth setting image when the second image is selected by the first operation.

In the image display method according to the above aspect of the present disclosure, the first image may include a preview image of the input image adjusted based on the first setting value.

In the image display method according to the above aspect of the present disclosure, the first image may include a character string corresponding to the first setting value.

The image display method according to the above aspect of the present disclosure may further include: displaying a selection image including a sixth image that indicates a first option and a seventh image that indicates a second option before displaying the first setting image; displaying the first setting image when an operation for selecting the sixth image is received; and receiving a setting value for adjusting the input image from a server when an operation for selecting the seventh image is received.

In the image display method according to the above aspect of the present disclosure, the displaying the first setting image may be performed by a first image display device and a second image display device different from the first image display device, the displaying the adjusted input image may be performed by the second image display device, and the first image display device may display a fifth setting image including the first setting image and an eighth image.

The image display system according to one aspect of the present disclosure may have the following configuration.

The image display system according to the aspect of the present disclosure includes: a first image display device; and a second image display device different from the first image display device, in which the first image display device includes a first display device configured to display an image, and a first processor configured to control the first display device, the second image display device includes a second display device configured to display an image, and a second processor configured to control the second display device, the first processor is configured to display a first setting image including a first image that indicates a first setting value and a second image that indicates a second setting value on the first display device; receive a first operation for selecting one of the first image and the second image; display, when the first operation is received, a second setting image including a third image that indicates a third setting value and a fourth image that indicates a fourth setting value on the first display device, and receive a second operation for selecting one of the third image and the fourth image, and the second processor is configured to display an input image adjusted based on the first operation and the second operation on the second display device.

The image display apparatus according to one aspect of the present disclosure may have the following configuration.

The image display apparatus according to the aspect of the present disclosure includes: a display device configured to display an image; and a processor configured to control the display device, in which the processor is configured to display a first setting image including a first image that indicates a first setting value and a second image that indicates a second setting value on the display device, receive a first operation for selecting one of the first image and the second image, display, when the first operation is received, a second setting image including a third image that indicates a third setting value and a fourth image that indicates a fourth setting value on the display device, receive a second operation for selecting one of the third image and the fourth image, and display an input image adjusted based on the first operation and the second operation on the display device.

The image display method according to one aspect of the present disclosure may have the following configuration.

The image display method according to the aspect of the present disclosure includes: displaying a first setting image (brightness selection image 400) including a first image (fifth candidate image 410) that indicates a first setting value (fifth hue setting value) and a second image (sixth candidate image 420) that indicates a second setting value (sixth hue setting value); receiving a first operation for selecting one of the first image and the second image; displaying, when the first operation is received, a second setting image (adjustment color selection image 500) including a third image (seventh candidate image 510) that indicates a third setting value (seventh hue setting value) and a fourth image (eighth candidate image 520) that indicates a fourth setting value (eighth hue setting value); receiving a second operation for selecting one of the third image and the fourth image; and displaying an input image adjusted based on the first operation and the second operation.

In the image display method according to the above aspect of the present disclosure, the second setting image may further include a fifth image (advanced setting button 570), and the image display method may further include: receiving a third operation for selecting the fifth image in a period during which the second setting image is displayed; receiving, when the third operation is received, a fourth operation for inputting at least one numerical value for adjusting the input image; and displaying the input image adjusted based on the numerical value input by the fourth operation.

The image display method according to the above aspect of the present disclosure may further include: displaying the first setting value when the third operation is received after the first image is selected by the first operation; and displaying the second setting value when the third operation is received after the second image is selected by the first operation, in which the receiving the fourth operation includes receiving an operation for rewriting the first setting value when the third operation is received after the first image is selected by the first operation, and receiving an operation for rewriting the second setting value when the third operation is received after the second image is selected by the first operation.

The image display method according to the above aspect of the present disclosure may further include: displaying, when the third operation is received, a third setting image including a first numerical value input area that indicates a numerical value corresponding to a first setting item, a second numerical value input area that indicates a numerical value corresponding to a second setting item, and a third numerical value input area that indicates a numerical value corresponding to a third setting item, in which among the first numerical value input area, the second numerical value input area, and the third numerical value input area, a numerical value input area indicating the numerical value that is different from an initial value thereof is displayed in a mode different from those of other numerical value input areas.

In the image display method according to the above aspect of the present disclosure, the first image may include a preview image of the input image adjusted based on the first setting value.

In the image display method according to the above aspect of the present disclosure, the first image may include a character string corresponding to the first setting value.

The image display method according to the above aspect of the present disclosure may further include: displaying a selection image including a sixth image that indicates a first option and a seventh image that indicates a second option before displaying the first setting image; displaying the first setting image when an operation for selecting the sixth image is received; and receiving a setting value for adjusting the input image from a server when an operation for selecting the seventh image is received.

In the image display method according to the above aspect of the present disclosure, the displaying the first setting image may be performed by a first image display device and a second image display device different from the first image display device, the displaying the adjusted input image may be performed by the second image display device, and the first image display device may display a fifth setting image including the first setting image and an eighth image.

What is claimed is:

1. An image display method comprising:
   displaying a first setting image including a first image that indicates a first setting value and a second image that indicates a second setting value;
   receiving a first operation for selecting one of the first image and the second image;
   displaying, when the first operation is received, a second setting image including a third image that indicates a third setting value, a fourth image that indicates a fourth setting value, and a fifth image;

receiving a second operation for selecting one of the third image and the fourth image;
displaying an input image adjusted based on the first operation and the second operation;
receiving a third operation for selecting the fifth image in a period during which the second setting image is displayed;
receiving, when the third operation is received, a fourth operation for inputting at least one numerical value for adjusting the input image;
displaying the input image adjusted based on the numerical value input by the fourth operation;
displaying the first setting value when the third operation is received after the first image is selected by the first operation; and
displaying the second setting value when the third operation is received after the second image is selected by the first operation,
wherein the receiving the fourth operation includes
receiving an operation for rewriting the first setting value when the third operation is received after the first image is selected by the first operation, and
receiving an operation for rewriting the second setting value when the third operation is received after the second image is selected by the first operation.

2. The image display method according to claim 1, further comprising:
displaying, when the third operation is received, a third setting image including a first numerical value input area that indicates a numerical value corresponding to a first setting item, a second numerical value input area that indicates a numerical value corresponding to a second setting item, and a third numerical value input area that indicates a numerical value corresponding to a third setting item, wherein
among the first numerical value input area, the second numerical value input area, and the third numerical value input area, a numerical value input area indicating the numerical value that is different from an initial value thereof is displayed in a mode different from those of other numerical value input areas.

3. The image display method according to claim 1, further comprising:
displaying the second setting image when the first image is selected by the first operation;
displaying a fourth setting image when the second operation is received; and
displaying the fourth setting image when the second image is selected by the first operation.

4. The image processing apparatus according to claim 1, wherein
the first image includes a preview image of the input image adjusted based on the first setting value.

5. The image display method according to claim 1, wherein
the first image includes a character string corresponding to the first setting value.

6. The image display method according to claim 1, further comprising:
displaying a selection image including a sixth image that indicates a first option and a seventh image that indicates a second option before displaying the first setting image;
displaying the first setting image when an operation for selecting the sixth image is received; and receiving a setting value for adjusting the input image from a server when an operation for selecting the seventh image is received.

7. The image display method according to claim 1, wherein
the displaying the first setting image is performed by a first image display device and a second image display device different from the first image display device,
the displaying the adjusted input image is performed by the second image display device, and
the first image display device displays a fifth setting image including the first setting image and an eighth image.

8. An image display apparatus comprising:
a display device configured to display an image; and
a processor configured to control the display device, wherein
the processor is configured to:
display a first setting image including a first image that indicates a first setting value and a second image that indicates a second setting value on the display device,
receive a first operation for selecting one of the first image and the second image,
display, when the first operation is received, a second setting image including a third image that indicates a third setting value, a fourth image that indicates a fourth setting value on the display device, and a fifth image,
receive a second operation for selecting one of the third image and the fourth image,
display an input image adjusted based on the first operation and the second operation on the display device,
receive a third operation for selecting the fifth image in a period during which the second setting image is displayed,
receive, when the third operation is received, a fourth operation for inputting at least one numerical value for adjusting the input image,
display the input image adjusted based on the numerical value input by the fourth operation,
display the first setting value when the third operation is received after the first image is selected by the first operation, and
display the second setting value when the third operation is received after the second image is selected by the first operation; and
the receiving the fourth operation includes
receiving an operation for rewriting the first setting value when the third operation is received after the first image is selected by the first operation, and
receiving an operation for rewriting the second setting value when the third operation is received after the second image is selected by the first operation.

9. An image display method comprising:
displaying a first setting image including a first image that indicates a first setting value and a second image that indicates a second setting value;
receiving a first operation for selecting one of the first image and the second image;
displaying, when the first operation is received, a second setting image including a third image that indicates a third setting value, a fourth image that indicates a fourth setting value, and a fifth image;
receiving a second operation for selecting one of the third image and the fourth image;

displaying an input image adjusted based on the first operation and the second operation;

receiving a third operation for selecting the fifth image in a period during which the second setting image is displayed;

receiving, when the third operation is received, a fourth operation for inputting at least one numerical value for adjusting the input image;

displaying the input image adjusted based on the numerical value input by the fourth operation; and displaying, when the third operation is received, a third setting image including a first numerical value input area that indicates a numerical value corresponding to a first setting item, a second numerical value input area that indicates a numerical value corresponding to a second setting item, and a third numerical value input area that indicates a numerical value corresponding to a third setting item, wherein among the first numerical value input area, the second numerical value input area, and the third numerical value input area, a numerical value input area indicating the numerical value that is different from an initial value thereof is displayed in a mode different from those of other numerical value input areas.

* * * * *